United States Patent
Nakajima

(10) Patent No.: US 9,581,991 B2
(45) Date of Patent: Feb. 28, 2017

(54) DNC OPERATION SYSTEM

(71) Applicant: FANUC Corporation, Yamanashi (JP)

(72) Inventor: Masatoshi Nakajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 383 days.

(21) Appl. No.: 14/254,703

(22) Filed: Apr. 16, 2014

(65) Prior Publication Data

US 2014/0316536 A1    Oct. 23, 2014

(30) Foreign Application Priority Data

Apr. 18, 2013    (JP) .................................. 2013-087542

(51) Int. Cl.
| | | |
|---|---|---|
| G05B 11/01 | (2006.01) | |
| G05B 19/42 | (2006.01) | |
| G06F 19/00 | (2011.01) | |
| G05B 7/00 | (2006.01) | |
| G05B 19/18 | (2006.01) | |
| G05B 19/414 | (2006.01) | |

(52) U.S. Cl.
CPC ........... *G05B 19/18* (2013.01); *G05B 19/414* (2013.01); *G05B 2219/33101* (2013.01); *Y02P 90/06* (2015.11)

(58) Field of Classification Search
USPC .................................................... 700/23, 83
See application file for complete search history.

(56) References Cited

U.S. PATENT DOCUMENTS

| | | | | |
|---|---|---|---|---|
| 4,152,765 A | * | 5/1979 | Weber .............. | G05B 19/40935 318/568.1 |
| 4,794,541 A | * | 12/1988 | Kiya .................... | G05B 19/408 700/159 |
| 5,517,639 A | | 5/1996 | Yamaguchi | |
| 6,039,168 A | * | 3/2000 | Head, III ........... | G05B 19/0426 198/341.07 |

(Continued)

FOREIGN PATENT DOCUMENTS

| | | |
|---|---|---|
| CN | 1405674 A | 3/2003 |
| CN | 101713977 A | 5/2010 |

(Continued)

OTHER PUBLICATIONS

Office Action dated Aug. 26, 2015, corresponding to Chinese Patent Application No. 201410158480.4.

(Continued)

*Primary Examiner* — Mohammad Ali
*Assistant Examiner* — M D Azad
(74) *Attorney, Agent, or Firm* — Hauptman Ham, LLP

(57) ABSTRACT

When a numerical controller enters a DNC operation mode, a host apparatus transmits NC data to the numerical controller. When the received NC data includes a sub program call, a repeat instruction or a branch instruction, the numerical controller stores search information that is required for executing these instructions. When the numerical controller includes search information, the host apparatus transmits, to the numerical controller, NC data corresponding to the search information. The numerical controller analyzes the received NC data and executes operation.

4 Claims, 17 Drawing Sheets

(56) References Cited

U.S. PATENT DOCUMENTS

2004/0034443 A1* 2/2004 Hosokawa ........... G05B 19/408
                                                   700/181
2006/0004479 A1* 1/2006 Oyama .............. G05B 19/4155
                                                   700/181

FOREIGN PATENT DOCUMENTS

| CN | 101826273 A | 9/2010 |
|----|-------------|--------|
| CN | 102043394 A | 5/2011 |
| JP | 63-37403 A | 2/1988 |
| JP | H01195509 A | 8/1989 |
| JP | H01230101 A | 9/1989 |
| JP | 4-52203 U | 5/1992 |
| JP | 4-294404 A | 10/1992 |
| JP | 2728256 B2 | 3/1998 |
| JP | 2992163 B2 | 12/1999 |
| JP | 2002-222005 A | 8/2002 |

OTHER PUBLICATIONS

Decision to Grant a Patent mailed Dec. 16, 2014, corresponding to Japanese patent application No. 2013-087542.

* cited by examiner

DNC OPERATION SYSTEM

RELATED APPLICATIONS

The present application claims priority to Japanese Application Number 2013-087542, filed Apr. 18, 2013, the disclosure of which is hereby incorporated by reference herein in its entirety.

BACKGROUND OF THE INVENTION

1. Field of the Invention

The present invention relates to a DNC operation system which causes a host computer (hereinafter referred to as the "host apparatus") to successively send NC data to a numerical controller that controls the drive of machinery, and uses the transmitted NC data to perform operations of such machinery.

2. Description of the Related Art

A standard operation performed by a numerical controller is the system of registering the NC data in a storage device such as an SRAM or a DRAM that is built into the numerical controller, and thereby performing operations (hereinafter referred to as the "memory operation"). Nevertheless, pursuant to the high-precision of part shapes and the enlargement of parts, the size of NC data is increasing, and there is a problem in that the NC data cannot be registered in the storage device in the numerical controller, and demands for the direct numerical control (DNC) operation of performing operations while transmitting the NC data from the host apparatus are increasing.

Moreover, even if it is possible to register the NC data for creating one part in the storage device in the numerical controller, different large-capacity NC data is required for each part in order to perform a small lot production of many products, and there is a problem in that the NC data registered in the storage device in the numerical controller needs to be replaced as required, and there are demands for realizing the DNC operation with only the NC data that is registered in the storage device in the host apparatus.

Technologies of a conventional DNC operation system are now explained based on the first system shown in FIG. 17 and the second system shown in FIG. 18.

With the first system of the conventional DNC operation, NC data is transmitted unidirectionally from the host apparatus to the numerical controller, and the numerical controller merely analyzes and executes the received NC data in succession. Thus, operations are performed without registering the transmitted NC data in the storage device in the numerical controller (refer to, for example, Japanese Patent Application Laid-Open No. 1-195509).

Moreover, with the second system of the conventional DNC operation, since the transmitted NC data is registered in the storage device in the numerical controller in order to realize a sub program call to the NC data stored in the storage device in the host apparatus, a registration start command and a registration end command are inserted, the NC data is registered as a subprogram in the storage device in the numerical controller together with the execution of the NC data, and the sub program registered in the storage device in the numerical controller is repeatedly executed later (refer to, for example, Japanese Patent Application Laid-Open No. 1-230101).

Since the first system of the DNC operation performs operations without registering the transmitted NC data in the storage device in the numerical controller, it is not possible to register information (sequence number, NC data itself, and so on) for performing a repeat instruction or a branch instruction, and these instructions cannot be executed. Moreover, with a sub program call, while the sub program call registered in the storage device in the numerical controller can be performed, since there are no means for notifying the call information (program name, NC data information of the restoration destination, and so on) to the host apparatus, it is not possible to perform the sub program call that is registered in the storage device in the host apparatus.

Thus, with regard to the NC data to be transmitted from the host apparatus, NC data, in which the sub program call, the repeat instruction, and the branch instruction are all expanded therein, needs to be created for exclusive use in the DNC operation, and the NC data of a format that can be used in the memory operation cannot be used as is, and there are problems in that it is difficult to create such exclusive NC data and the size of the NC data will also increase.

With the second system, the numerical controller needs to internally comprise a storage device for registering the transmitted NC data, and, as with the first system, NC data for exclusive use in the DNC operation needs to be created, and the NC data of a format that can be used in the memory operation cannot be used as is, and there are problems in that it is difficult to create such exclusive NC data and the size of the NC data will also increase.

SUMMARY OF THE INVENTION

Thus, in light of the problems encountered in the conventional technologies described above, an object of this invention is to provide a DNC operation method capable of performing the sub program call, the repeat instruction, and the branch instruction in the storage device in the host apparatus without having to create NC data for exclusive use in the DNC operation so that the NC data of a format that can be used in the memory operation can be used as is, and to provide a DNC operation system capable of performing operations only with the NC data stored in the storage device in the host apparatus as a result of enabling the use of only the storage device in the host apparatus as the registration destination of the NC data.

In order to perform the DNC operation, a host apparatus and a numerical controller are connected via a communication line (for instance, the Ethernet (registered trademark) or the like) which is capable of bidirectional communication. The numerical controller thereafter changes the operation mode to the DNC operation mode and, based on an operation start command, waits to receive NC data that is transmitted from the host apparatus. The host apparatus confirms that the numerical controller has been changed to the DNC operation mode and is waiting to receive the NC data, and then transmits first-time NC data.

The numerical controller that received the first-time NC data sequentially analyzes the received NC data, and determines whether the received NC data is one among a sub program call, a repeat instruction, and a branch instruction. When the NC data is any other instruction, data is transmitted to the operation instruction execution unit, and the NC data is executed.

When the NC data is one among the subprogram call, the repeat instruction, and the branch instruction, the numerical controller writes, into the storage device in the numerical controller, search information used for searching the NC data that is required by the host apparatus to execute the relevant instruction from the NC data stored in the storage device in the host apparatus, discards the received NC data, and waits for the NC data corresponding to the written search information to be transmitted from the host apparatus.

Note that the foregoing search information is, for example, a program name of the call destination in the case of a sub program call, and a program name of the call source and NC data information of the restoration destination in the case of restoration from the sub program call. Moreover, the foregoing search information is a program name of the repeat destination or the branch destination and sequence number information of the branch destination in the case of a repeat instruction and a branch instruction.

Moreover, since a sub program call is capable of multiple calls (hereinafter referred to as "nesting"), call information for each nesting is stored in the storage device in the numerical controller so that the search information regarding the running sub program can be notified to the host apparatus.

The host apparatus reads and confirms the search information via the communication line before transmitting second-time NC data. When no search information has been written, the second-time NC data is transmitted as is. When search information has been written, the information thereof is analyzed, necessary NC data is searched from the NC data stored in the storage device in the host apparatus, and the NC data to be transmitted in the second time is prepared. Subsequently, the search information in the numerical controller is cleared via the communication line, and information indicating that it is NC data that has been searched (hereinafter referred to as the "searched NC data") is added to the head of the NC data to be transmitted based on the search information, and the NC data is thereby transmitted.

When the NC data that was received in the first time was only an operation instruction; that is, when search information to be written does not exist in the NC data, the numerical controller executes the same processing as the first time to the NC data that was received in the second time. When the NC data received in the first time includes one among the sub program call, the repeat instruction, and the branch instruction; that is, when search information to be written exists in the NC data, it is determined whether or not the NC data received in the second time is the searched NC data, and, when the received NC data is not the searched NC data, the received NC data is discarded until the searched NC data is received. When it is determined that the received NC data is the searched NC data, the same processing as the first time is executed.

As a result of repeating this processing until the NC data for the DNC operation is ended, operations can be performed using the NC data of a format that can be used in the memory operation as is, and the DNC operation can be performed only with the NC data stored in the storage device in the host apparatus.

Note that, while the foregoing explained a case of the host apparatus reading the search information that was written into the storage device in the numerical controller, the search information may also be transmitted directly to the host apparatus via the communication line in substitute for being written into the storage device in the numerical controller.

Moreover, when the numerical controller simultaneously performs the processing of analysis and operation to the received NC data, a delay will arise by the time that the search information is written, or a delay will arise after the transmission until the host apparatus searches and transmits the searched NC data, and there is a problem in that the operation is temporarily discontinued. This problem can be resolved by performing the analysis processing of the NC data (that is, performing the prefetch analysis) antecedent to the operation processing.

Furthermore, the host apparatus can speed up the search of the NC data with regard to the search information by analyzing the NC data before transmitting the NC data, compiling a database of a sequence number required for searching the NC data and a folder name containing a block pointer or a sub program in the NC data corresponding to the sequence number, and thereafter transmitting the NC data. Consequently, the search for the searched NC data to be transmitted to the numerical controller can be further sped up.

According to the present invention, it is possible to provide a DNC operation method capable of performing the sub program call, the repeat instruction, and the branch instruction in the storage device in the host apparatus without having to create NC data for exclusive use in the DNC operation so that the NC data of a format that can be used in the memory operation can be used as is, and to provide a DNC operation system capable of performing operations only with the NC data stored in the storage device in the host apparatus as a result of enabling the use of only the storage device in the host apparatus as the registration destination of the NC data.

BRIEF DESCRIPTION OF THE DRAWINGS

The foregoing and other objects and features of the present invention shall become clear from the description of the following embodiments made with reference to the appended drawings. Among the appended drawings.

DESCRIPTION OF THE PREFERRED EMBODIMENTS

The DNC device according to the present invention adopts a numerical control system (hereinafter referred to as the "DNC operation") that causes a host computer (hereinafter referred to as the "host apparatus") to successively transmit NC data to a numerical controller via a bidirectional communication line, and perform operations using the transmitted NC data. With this numerical control system, the numerical controller realizes a DNC operation capable of executing a sub program call, a repeat instruction, and a branch instruction simply by using the NC data stored in a storage device such as a hard disk, a solid state drive, or a compact flash card that is built into, or connected to, the host apparatus. Note that the numerical controller controls machine tools, industrial machines and the like according to the NC data (processing program and the like).

The first embodiment of the DNC operation system according to the present invention is foremost explained with reference to FIG. 1 to FIG. 4.

Figure 1:
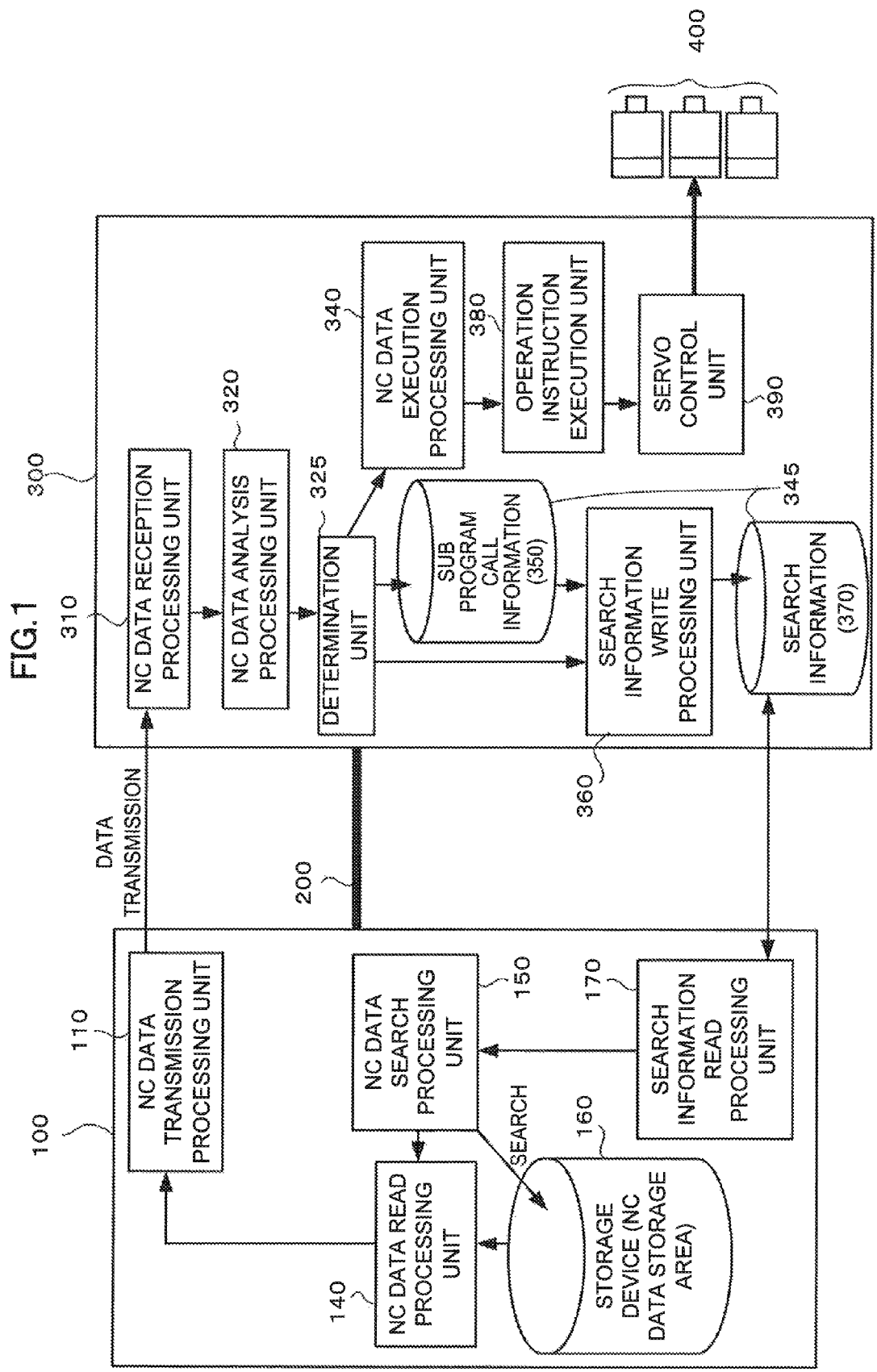
FIG. 1 is a block diagram showing the first embodiment of the DNC operation system according to the present invention.
Figure 2:
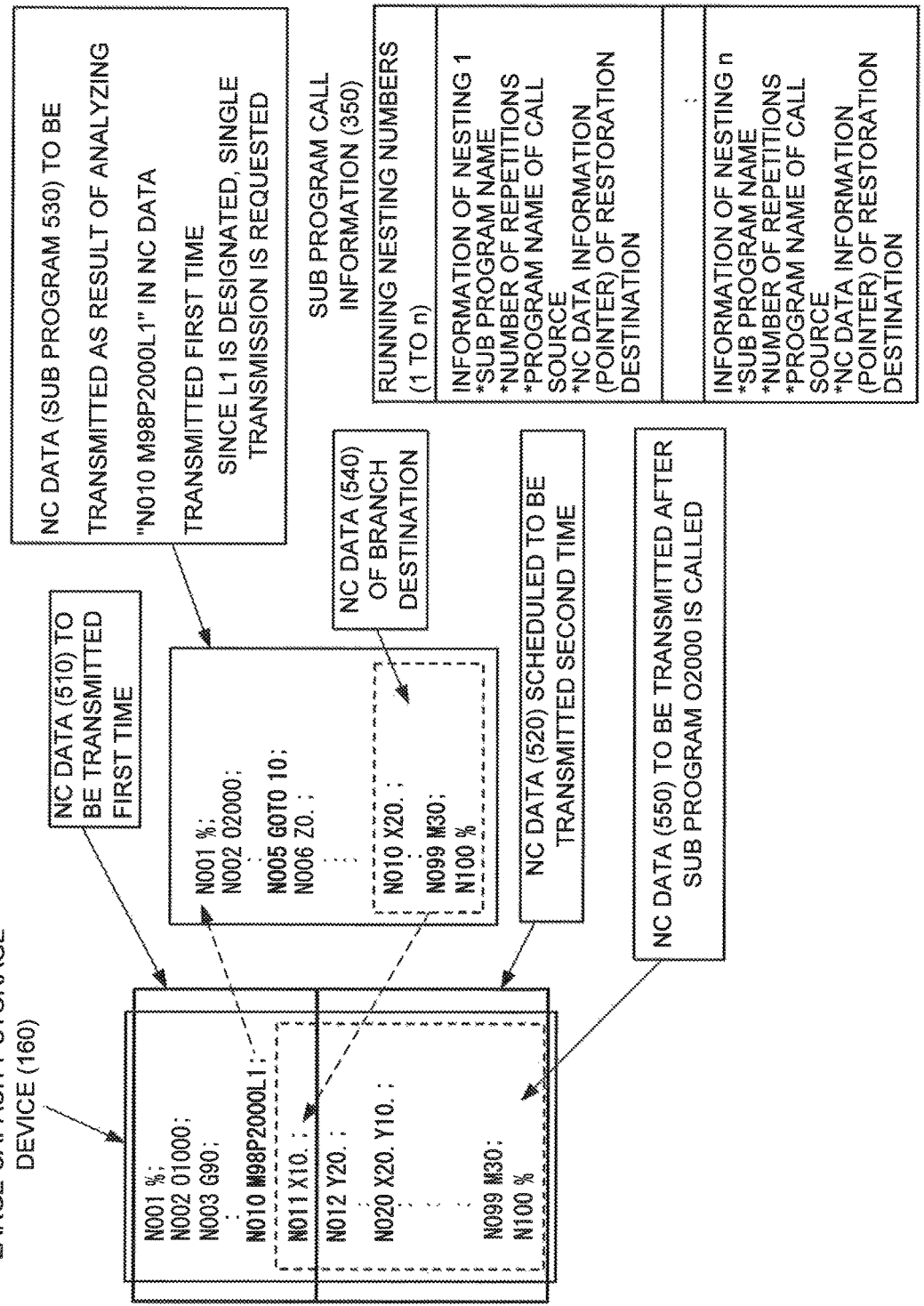
FIG. 2 is a diagram explaining an example of the program to be executed by the DNC operation system depicted in FIG. 1.

FIG. 1 is a block diagram showing the first embodiment of the DNC operation system according to the present invention, and FIG. 2 is a diagram explaining an example of the program to be executed by the DNC operation system depicted in FIG. 1.

The DNC operation system connects a host apparatus 100 and a numerical controller 300 via a bidirectional communication line 200 such as the Ethernet (registered trademark) which is capable of bidirectional communication.

(1) The numerical controller 300 changes the operation mode to the DNC operation mode and, based on an operation start command, waits to receive first-time NC data 510 that is transmitted from the host apparatus 100 via the bidirectional communication line 200.

(2) After confirming that the numerical controller 300 has been changed to the DNC operation mode based on the operator's operation or the like and is waiting to receive the NC data, the NC data read processing unit 140 in the host apparatus 100 acquires, from the storage device 160, the NC data 510 (refer to FIG. 2) to be sent the first time. Subsequently, the host apparatus 100 transmits the acquired NC data 510 from the NC data transmission processing unit 110 to the numerical controller 300 via the bidirectional communication line 200.

(3) The numerical controller 300 receives the first-time NC data 510 from the NC data reception processing unit 310, and the NC data analysis processing unit 320 in the numerical controller 300 sequentially analyzes the received first-time NC data 510. Subsequently, the determination unit 325 determines whether the analyzed NC data 510 includes one among a sub program call, a repeat instruction, and a branch instruction.

(4) When the analyzed NC data 510 was an instruction other than the sub program call, the repeat instruction, and the branch instruction, the numerical controller 300 transmits the analyzed NC data from the determination unit 325 to the NC data execution processing unit 340, drives a servo motor 400 from an operation command execution unit 380 via a servo control unit 390, and thereby executes the NC data.

(5) Meanwhile, when the analyzed NC data 510 was one among the sub program call, the repeat instruction, and the branch instruction, the search information write processing unit 360 in the numerical controller 300 writes the search information 370 (information used for searching the NC data that is required by the host apparatus 100 to execute the relevant instruction from the NC data stored in the storage device 160 in the host apparatus 100) into a storage device 345 in the numerical controller 300. In addition, the numerical controller 300 discards the received NC data, and waits for the searched NC data corresponding to the contents written into the search information 370 to be transmitted from the host apparatus 100.

In the example shown in FIG. 1 and FIG. 2, since "N010 M98P2000L1" in the NC data 510 is a sub program call command, the running nesting number of the sub program call information 350 is confirmed. Since the nesting number is "0", [sub program name], [number of repetitions (once since L1 is designated)], [program name (O1000) of call source], and [NC data information of restoration destination (pointer to N011 X10.;)] are written into the information of the nesting 1. Subsequently, the running nesting number is set to "1", and, after subtracting "1" from the number of repetitions, [sub program name (O2000)] is written into the search information 370 in the storage device 345 as the search information. Subsequently, the NC data of blocks "N011 X10.;" and subsequent blocks which were received with the NC data 510 are discarded.

(6) Before transmitting the NC data 520 which is scheduled to be transmitted the second time, the search information read processing unit 170 in the host apparatus 100 reads and confirms the contents of the search information 370 via the bidirectional communication line 200. When no search information 370 has been written into the storage device 345 in the numerical controller 300, the second-time NC data 520 is transmitted as is. In the example of FIG. 1 and FIG. 2, since the search information [sub program name (O2000)] written in (5) above exists as the search information 370, the NC data search processing unit 150 searches for the required NC data 530 from the storage device 160 based on the search information. Subsequently, the NC data 530 to be transmitted is read from the storage device 160 by the NC data read processing unit 140, the contents of the search information 370 are thereafter cleared via the bidirectional communication line 200, and the searched NC data 530 is transmitted from the NC data transmission processing unit 110 to the numerical controller 300 via the bidirectional communication line 200.

(7) The NC data analysis processing unit 320 in the numerical controller 300 analyzes the NC data 530 that was received once again, and the NC data analysis processing unit 320 executes the NC data in the same manner as (4) above. However, at the point in time that the branch instruction ("N005 GOTO 10") existing in the NC data 530 is analyzed, the [program name (O2000)] and the [sequence number (N010)] of the branch destination are written into the search information 370 in the storage device 345. Subsequently, the numerical controller 300 discards the received NC data "N006 Z0.;" and subsequent NC data, among the NC data 530, and waits for the transmission of the NC data 540 of the branch destination from the host apparatus 100.

(8) Since the data to be subsequently transmitted is unknown after the transmission of the NC data 530, the search information read processing unit 170 in the host apparatus 100 confirms the search information 370 at predetermined intervals. Thereafter, at the point in time that the contents of the search information 370 written in (7) above are read by the search information read processing unit 170, the NC data search processing unit 150 searches for the NC data 540, which is to be transmitted subsequently, from the storage device 160. Subsequently, the NC data read processing unit 140 reads the searched NC data 540 from the storage device 160, and the read NC data 540 is transmitted from the NC data transmission processing unit 110 to the numerical controller 300 via the bidirectional communication line 200.

(9) The NC data analysis processing unit 320 in the numerical controller 300 analyzes the received NC data 540, and the numerical controller 300 executes the NC data in the same manner as (4) above. However, since the block (end of sub program) of "N099 M99" exists in the NC data 540, this block is analyzed. Subsequently, the number of repetitions in the information of the running nesting number "1" (example of FIG. 2) of the sub program call information 350 is confirmed. Since "0" is written as the number of repetitions, this is deemed to be the end of the sub program call, and "1" is subtracted from the running nesting number to achieve "0" (1−1=0). Subsequently, the [program name (O1000) of call source], and [NC data information of restoration destination (points to N011 X10.;)], which are written as the information of the nesting 1 of the sub program call information 350, are written into the search information 370 stored in the storage device 345 as the search information. The numerical controller 300 thereby waits for the NC data 550, which is to be executed after the sub program call, to be transmitted from the host apparatus 100.

(10) Since the data to be subsequently transmitted is unknown after the transmission of the NC data 540, the search information read processing unit 170 in the host apparatus 100 confirms the search information 370 at predetermined intervals. Thereafter, at the point in time that the contents of the search information 370 written in (9) above are read by the search information read processing unit 170, the NC data search processing unit 150 searches for the NC data 550, which is to be transmitted subsequently, from the storage device 160. Subsequently, the NC data read processing unit 140 reads the searched NC data 550 from the storage device 160, and the read NC data 550 is transmitted from the NC data transmission processing unit 110 to the numerical controller 300 via the bidirectional communication line 200.

(11) The NC data analysis processing unit 320 in the numerical controller 300 analyzes the received NC data 550. Subsequently, the determination unit 325 determines that the analyzed NC data 550 is not one among the sub program call, the repeat instruction, and the branch instruction. Consequently, the NC data 550 is sequentially transmitted to the NC data execution processing unit 340, the NC data is executed in the same manner as (4) above, "N099 M30 (program end)" is thereafter executed, and the DNC operation is then ended.

Figure 3:
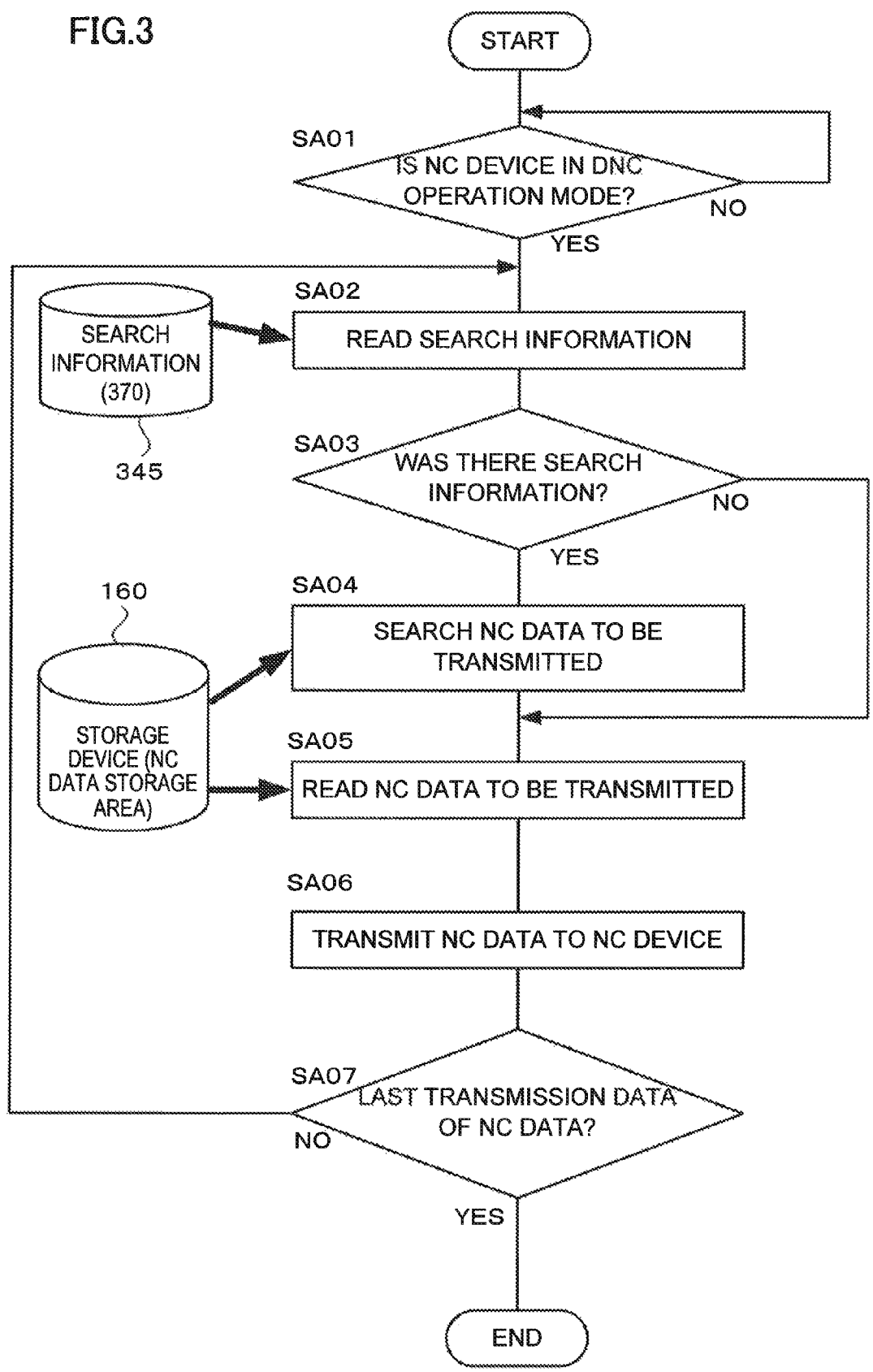
FIG. 3 is a flowchart explaining the flow of processing to be executed by the host apparatus (host computer) configuring the DNC operation system depicted in FIG. 1.
Figure 4:
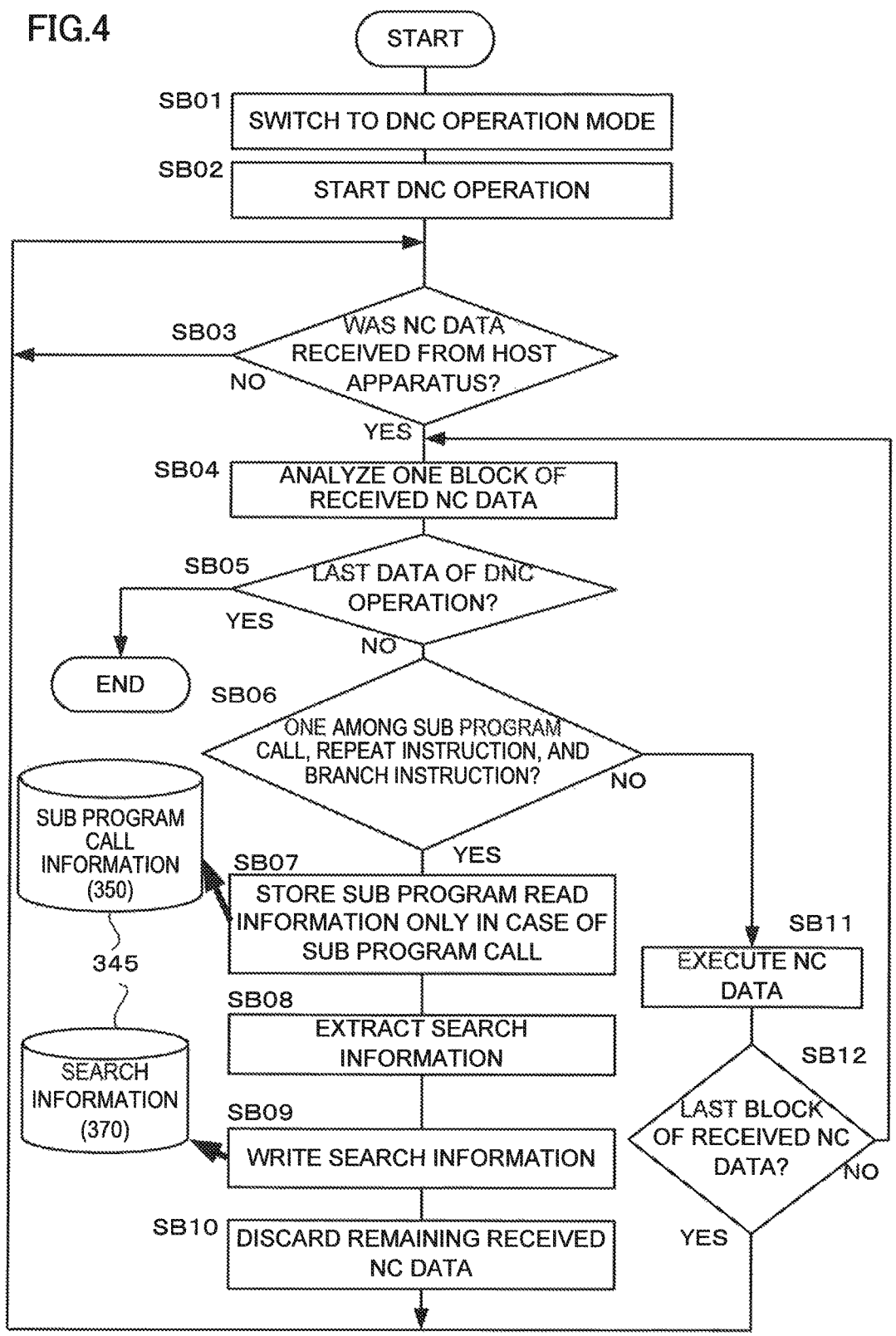
FIG. 4 is a flowchart explaining the flow of processing to be executed by the numerical controller configuring the DNC operation system depicted in FIG. 1.

The processing to be executed by the host apparatus 100 and the numerical controller 300 depicted in FIG. 1 is now explained with reference to the flowcharts shown in FIG. 3 and FIG. 4. FIG. 3 is a flowchart explaining the flow of processing to be executed by the host apparatus 100 configuring the DNC operation system depicted in FIG. 1, and FIG. 4 is a flowchart explaining the flow of processing to be executed by the numerical controller 300 configuring the DNC operation system depicted in FIG. 1.

(Flow of Processing to be Executed by Host Apparatus 100)

[Step SA01] It is determined whether the numerical controller 300 is in the DNC operation mode or not. If the numerical controller 300 is in the DNC operation mode (YES), the process proceeds to step SA02. If the numerical controller 300 is not in the DNC operation mode (NO), the process waits until the numerical controller 300 switches to the DNC operation mode.

[Step SA02] Processing of reading the search information 370 from the storage device 345 in the numerical controller 300 is performed.

[Step SA03] It is determined whether or not there was any search information 370 that was read in the processing of step SA02. If there was such a search information 370 (YES), the process proceeds to step SA04. If there was not such a search information 370 (NO), the process proceeds to step SA05.

[Step SA04] The NC data corresponding to the search information 370 is searched from the storage device 160 in the host apparatus 100.

[Step SA05] The NC data corresponding to the search information 370 (when the search information 370 was read) or subsequent data of the NC data that was transmitted the last time (when the search information 370 was not read) is read from the storage device 160.

[Step SA06] The NC data that was read in step SA05 is transmitted to the numerical controller 300.

[Step SA07] It is determined whether the NC data that was transmitted to the numerical controller 300 is the last transmission data or not. If the transmitted NC data is the last transmission data (YES), this processing ends. If the transmitted NC data is not the last transmission data (NO), the process returns to step SA02 and the processing continues.

(Flow of Processing to be Executed by Numerical Controller 300)

[Step SB01] An operation mode is switched to the DNC operation mode. For example, it is checked whether an operator issued a switching command for switching to the DNC operation mode from an operation screen or the like, and if confirmed that a switching command was issued, then an operation mode is switched to the DNC operation mode.

[Step SB02] The DNC operation is started.

[Step SB03] It is determined whether or not the NC data was received from the host apparatus 100. If the NC data was received (YES), the process proceeds to step SB04. If the NC data was not received (NO), the process waits for the reception of the NC data.

[Step SB04] One block of the received NC data is analyzed.

[Step SB05] It is determined whether or not the received NC data is the last data of the DNC operation. If the received NC data is the last data (YES), the processing ends. If the received NC data is not the last data (NO), the process proceeds to step SB06.

[Step SB06] It is determined whether the received NC data is one among a sub program call, a repeat instruction, and a branch instruction. If the received NC data is one among the sub program call, the repeat instruction, and the branch instruction (YES), the process proceeds to step SB07. If the received NC data is not one among the sub program call, the repeat instruction, and the branch instruction (NO), the process proceeds to step SB11.

[Step SB07] The sub program call information is stored only when the received NC data is a sub program call.

[Step SB08] The search information is extracted.

[Step SB09] The extracted search information is written into the search information 370 in the storage device 345.

[Step SB10] The remaining received NC data is discarded, and the process returns to step SB03 and the processing continues.

[Step SB11] One block of the received NC data is executed.

[Step SB12] It is determined whether or not the executed block is the last block of the received NC data. If the executed block is the last block (YES), the process returns to step SB03 and the processing continues. If the executed block is not the last block (NO), the process returns to step SB04 and the processing continues.

The second embodiment of the DNC operation system according to the present invention is now explained with reference to FIG. 5 to FIG. 8.

Figure 5:
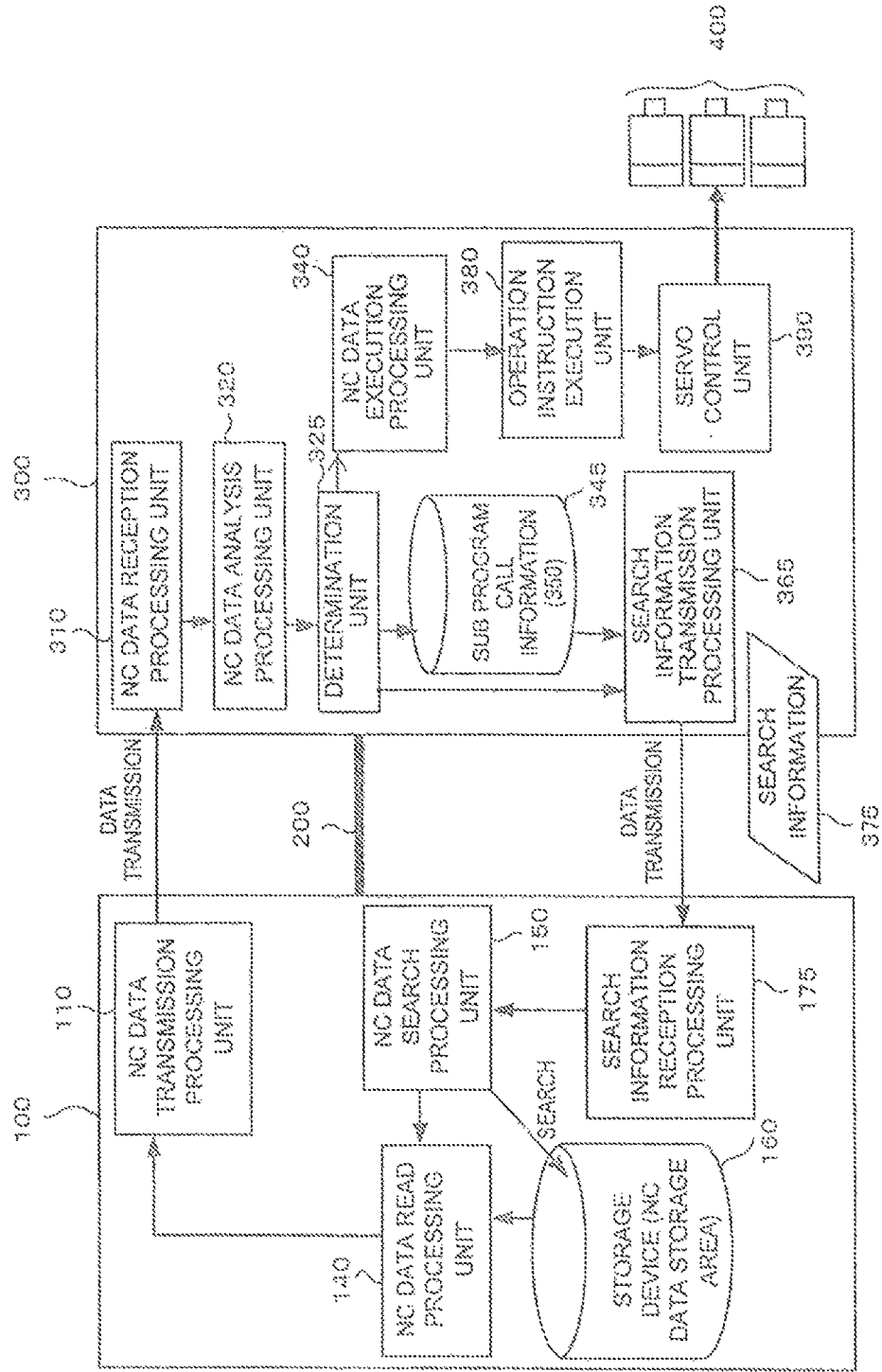
FIG. 5 is a block diagram showing the second embodiment of the DNC operation system according to the present invention.
Figure 6:
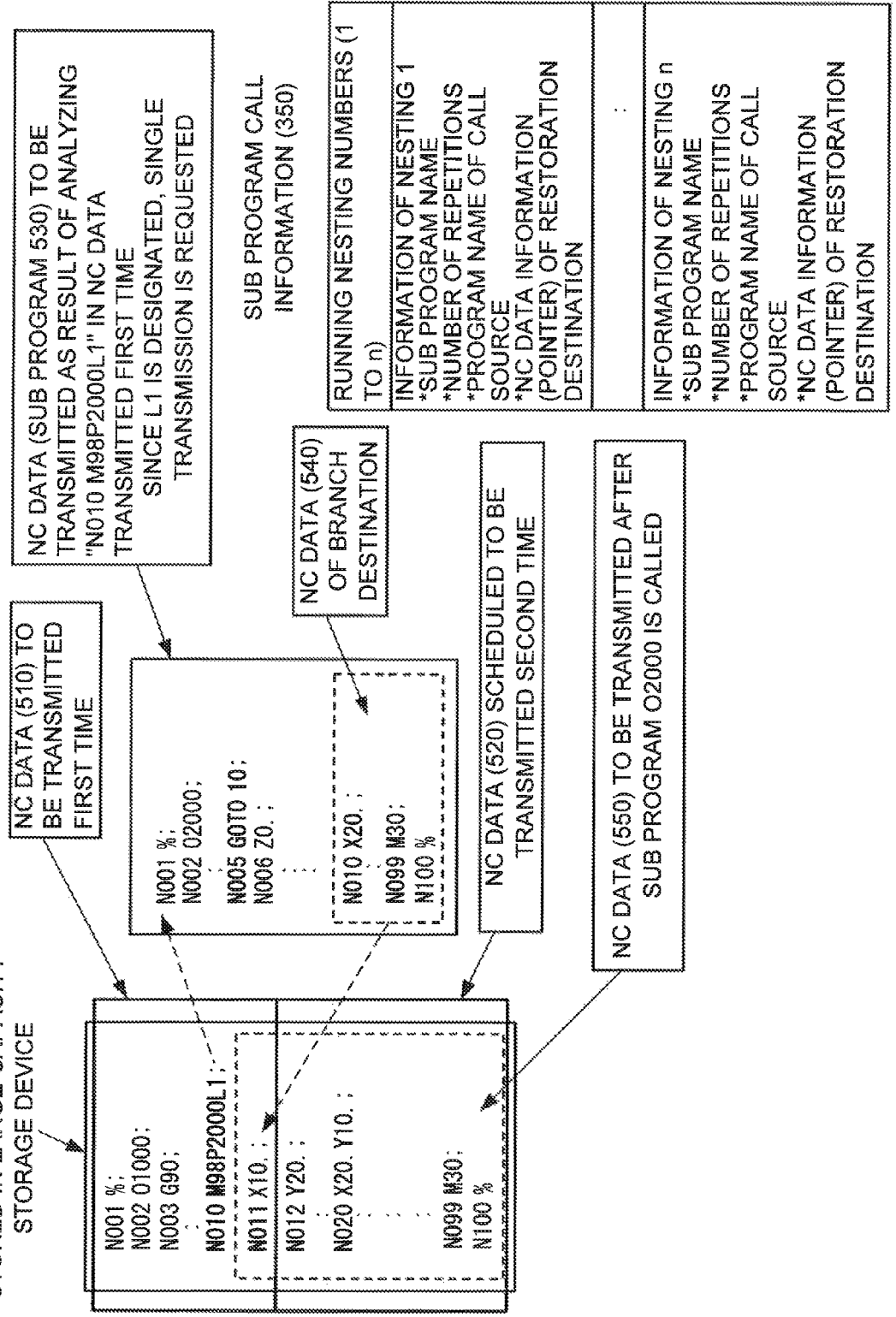
FIG. 6 is a diagram explaining an example of the program to be executed by the DNC operation system depicted in FIG. 5.

FIG. 5 is a block diagram showing the second mode of the DNC operation system according to the present invention, and FIG. 6 is a diagram explaining an example of the program to be executed by the DNC operation system depicted in FIG. 5.

(1) The numerical controller 300 changes the operation mode to the DNC operation mode and, based on an operation start command, waits to receive first-time NC data 510 that is transmitted from the host apparatus 100 via the bidirectional communication line 200.

(2) After confirming that the numerical controller 300 has been changed to the DNC operation mode and is waiting to receive the NC data, the NC data read processing unit 140 in the host apparatus 100 acquires, from the storage device 160, the NC data 510 (refer to FIG. 6) to be sent the first time. Subsequently, the host apparatus 100 transmits the acquired NC data 510 from the NC data transmission processing unit 110 to the numerical controller 300 via the bidirectional communication line 200.

(3) The numerical controller 300 receives the first-time NC data 510 from the NC data reception processing unit 310, and the NC data analysis processing unit 320 in the numerical controller 300 sequentially analyzes the received first-time NC data 510. Subsequently, the determination unit 325 determines whether the analyzed NC data 510 is one among a sub program call, a repeat instruction, and a branch instruction.

(4) When the analyzed NC data was an instruction other than the sub program call, the repeat instruction, and the branch instruction, the numerical controller 300 transmits the analyzed NC data from the determination unit 325 to the NC data execution processing unit 340, drives a servo motor 400 from an operation command execution unit 380 via a servo control unit 390, and thereby executes the NC data.

(5) Meanwhile, when the analyzed NC data 510 was one among the sub program call, the repeat instruction, and the branch instruction, the search information transmission processing unit 365 in the numerical controller 300 transmits the search information 375 (information used for searching the NC data that is required by the host apparatus 100 to execute the relevant instruction from the NC data stored in the storage device 160 in the host apparatus 100) to the host apparatus 100. In addition, the numerical controller 300 discards the received NC data, and waits for the searched NC data corresponding to the contents of the transmitted search information 375 to be transmitted from the host apparatus 100.

In the example shown in FIG. 5 and FIG. 6, since "N010 M98P2000L1" in the NC data 510 is a sub program call command, the running nesting number of the sub program call information 350 is confirmed. Since the nesting number is "0", [sub program name], [number of repetitions (once since L1 is designated)], [program name (O1000) of call source], and [NC data information of restoration destination (pointer to N011 X10.;)] are written into the information of the nesting 1. Subsequently, the running nesting number is set to "1", and, after subtracting "1" from the number of repetitions, [sub program name (O2000)] is transmitted from the search information transmission processing unit 365 to the host apparatus 100 as the search information 375. Subsequently, the NC data "N011 X10.;" and subsequent NC data, which were received with the NC data 510, are discarded.

(6) Before transmitting the NC data 520 which is scheduled to be transmitted the second time, the host apparatus 100 confirms the existence of the search information 375 transmitted from the search information transmission processing unit 365 in the numerical controller 300 to the search information reception processing unit 175. When the search information 375 has not been acquired, the second-time NC data 520 is transmitted as is. In the example of FIG. 5 and FIG. 6, since the [sub program name (O2000)] transmitted in (5) above has been acquired as the search information 375, the NC data search processing unit 150 searches for the required NC data 530 from the storage device 160 based on the search information, and the NC data read processing unit 140 reads the NC data 530 to be transmitted. Subsequently, the searched NC data 530 is transmitted from the NC data transmission processing unit 110 to the numerical controller 300.

(7) The NC data analysis processing unit 320 in the numerical controller 300 analyzes the NC data 530 that was received once again, and executes the NC data in the same manner as (4) above. However, at the point in time that the branch instruction ("N005 GOTO 10") existing in the NC data 530 is analyzed, the [program name (O2000)] and the [sequence number (N010)] of the branch destination are transmitted from the search information transmission processing unit 365 to the host apparatus as the search information 375. Subsequently, the numerical controller 300 discards the received NC data "N006 Z0.;" and subsequent NC data, among the NC data 530, and waits for the transmission of the NC data 540 of the branch destination from the host apparatus 100.

(8) Since the data to be subsequently transmitted is unknown after the transmission of the NC data 530, the search information reception processing unit 175 in the host apparatus 100 confirms the search information 375 at predetermined intervals. Thereafter, at the point in time that the acquisition of the search information 375 transmitted in (7) above is confirmed, the NC data search processing unit 150 searches for the NC data 540, which is to be transmitted subsequently. Subsequently, the NC data read processing unit 140 reads the searched NC data from the storage device 160, and the read NC data 540 is transmitted from the NC data transmission processing unit 110 to the numerical controller 300.

(9) The NC data analysis processing unit 320 in the numerical controller 300 analyzes the received NC data 540, and the numerical controller 300 executes the NC data in the same manner as (4) above. However, since the block (end of sub program) of "N099 M99" exists in the NC data 540, this block is analyzed. Subsequently, the number of repetitions of the information of the running nesting number "1" (example of FIG. 6) of the sub program call information 350 is confirmed. Since "0" is written as the number of repetitions, this is deemed to be the end of the sub program call, and "1" is subtracted from the running nesting number to achieve "0" (1−1=0). Subsequently, the [program name (O1000) of call source], and [NC data information of restoration destination (points to N011 X10.;)], which are written as the information of the nesting 1 of the sub program call information (350), are transmitted from the search information transmission processing unit 365 to the host apparatus 100 as the search information 375. The numerical controller 300 thereby waits for the NC data 550, which is to be executed after the sub program call, to be transmitted from the host apparatus 100.

(10) Since the data to be subsequently transmitted is unknown after the transmission of the NC data 540, the search information reception processing unit 175 in the host apparatus 100 confirms the acquired search information 375 at predetermined intervals. Thereafter, at the point in time that the acquisition of the search information 375 transmitted in (9) above is confirmed, the NC data search processing unit 150 searches for the NC data 550, which is to be transmitted subsequently, from the storage device 160. Subsequently, the NC data read processing unit 140 reads the searched NC data 550 from the storage device 160, and the read NC data 550 is transmitted from the NC data transmission processing unit 110 to the numerical controller via the bidirectional communication line 200.

(11) The NC data analysis processing unit 320 in the numerical controller 300 analyzes the received NC data 550, and, since the analyzed NC data 550 does not include one among the sub program call, the repeat instruction, and the branch instruction, the NC data is sequentially transmitted to the NC data execution processing unit 340, the NC data is executed in the same manner as (4) above, "N099 M30 (program end)" is thereafter executed, and the DNC operation is then ended.

Figure 7:
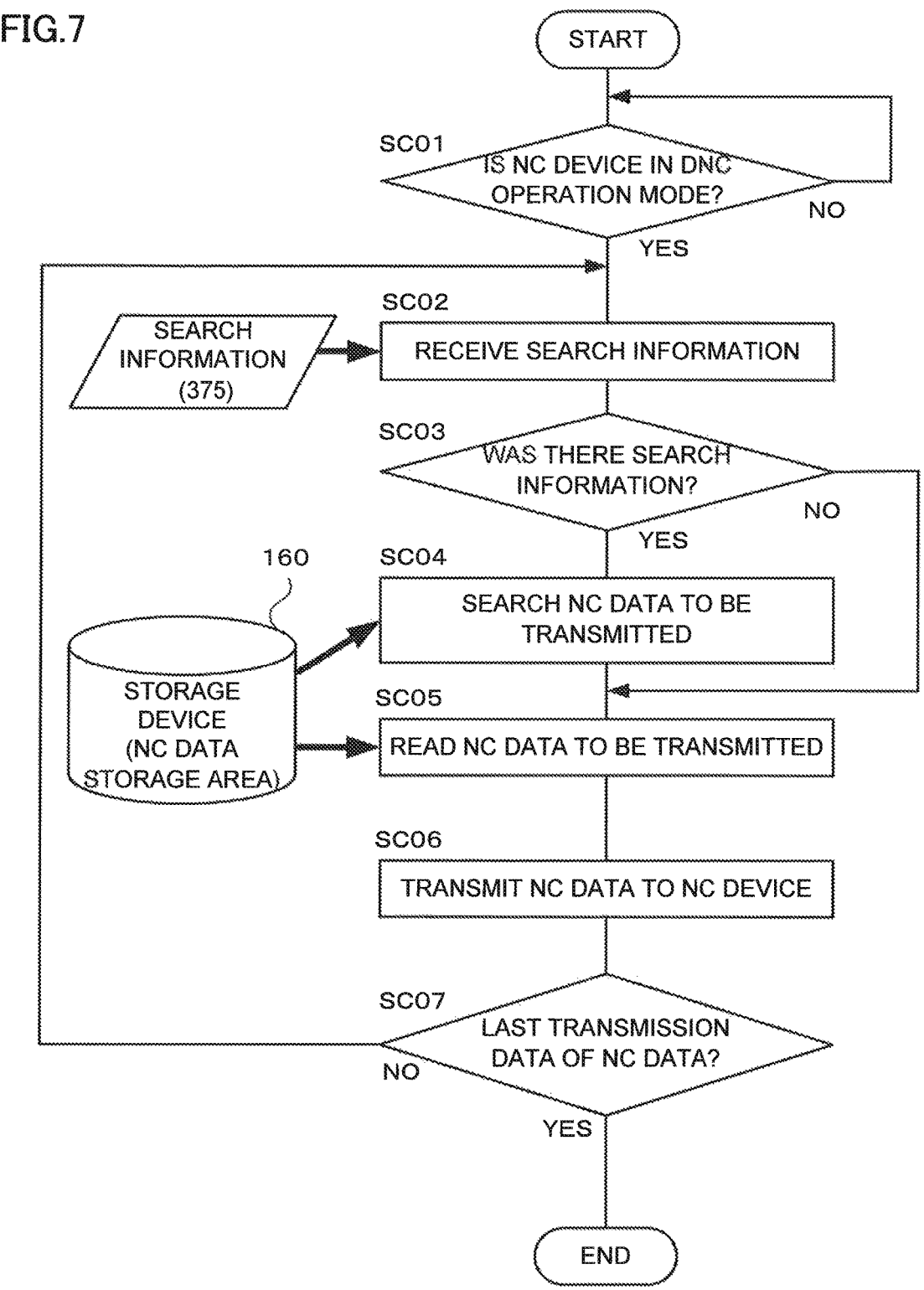
FIG. 7 is a flowchart explaining the flow of processing to be executed by the host apparatus (host computer) configuring the DNC operation system depicted in FIG. 5.
Figure 8:
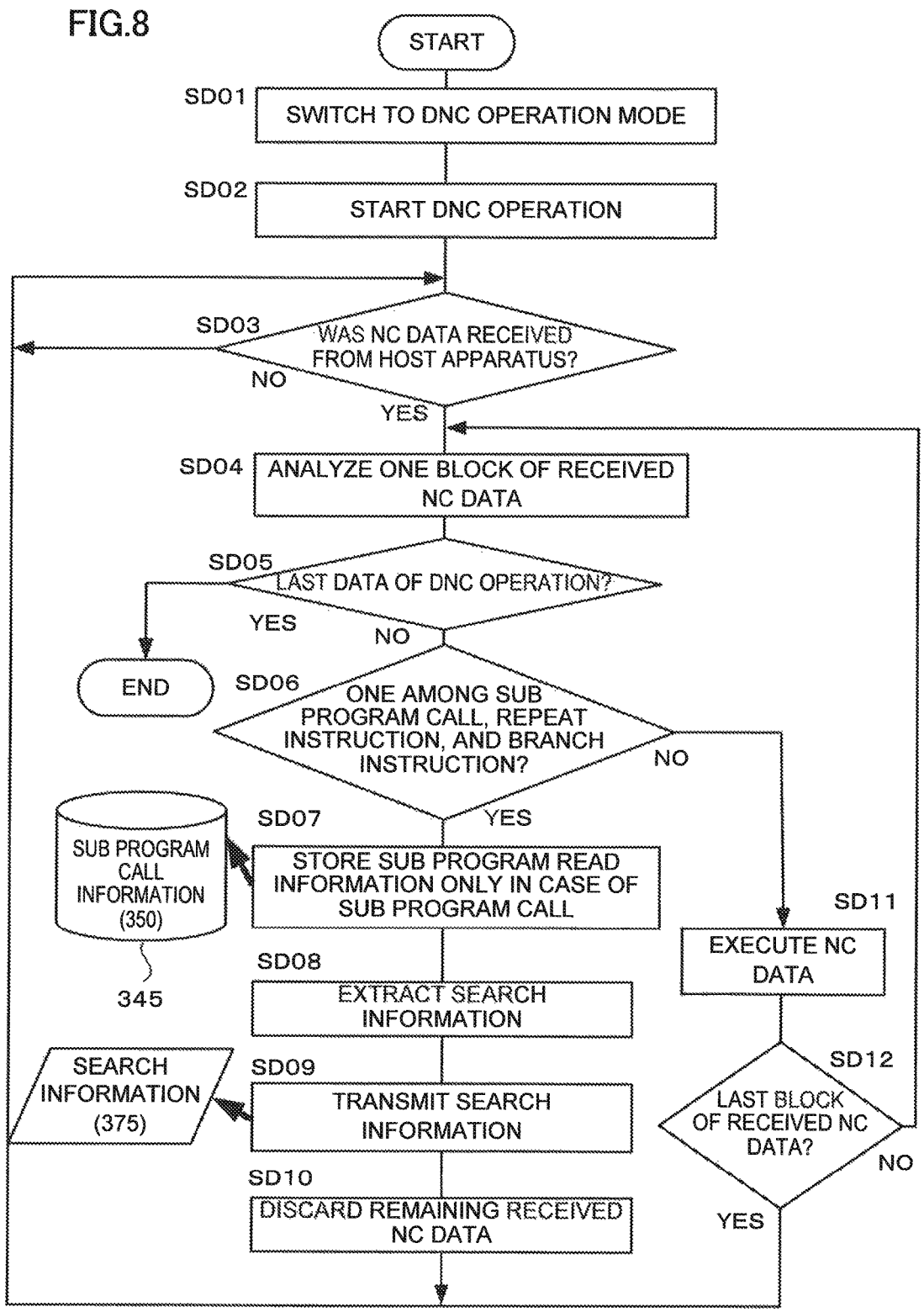
FIG. 8 is a flowchart explaining the flow of processing to be executed by the numerical controller configuring the DNC operation system depicted in FIG. 5.

The processing to be executed by the host apparatus 100 and the numerical controller 300 depicted in FIG. 5 is now explained with reference to the flowcharts shown in FIG. 7 and FIG. 8. FIG. 7 is a flowchart explaining the flow of processing to be executed by the host apparatus 100 depicted in FIG. 5, and FIG. 8 is a flowchart explaining the flow of processing to be executed by the numerical controller 300 depicted in FIG. 5.

(Flow of Processing to be Executed by Host Apparatus 100)

[Step SC01] It is determined whether the numerical controller 300 is in the DNC operation mode or not. If the numerical controller 300 is in the DNC operation mode (YES), the process proceeds to step SC02. If the numerical controller 300 is not in the DNC operation mode (NO), the process waits until the numerical controller 300 switches to the DNC operation mode.

[Step SC02] The search information 375 is received from the numerical controller 300.

[Step SC03] It is determined whether or not there was any search information 375 that was received in the processing of step SC02. If the search information 375 was received (YES), the process proceeds to step SC04. If the search information 375 was not received (NO), the process proceeds to step SC05.

[Step SC04] The NC data corresponding to the search information 375 is searched from the storage device 160 in the host apparatus 100.

[Step SC05] The NC data corresponding to the search information 375 (when the search information 375 was received) or subsequent data of the NC data that was transmitted the last time (when the search information 375 was not received) is read from the storage device 160.

[Step SC06] The NC data that was read in step SC05 is transmitted to the numerical controller 300.

[Step SC07] It is determined whether or not the NC data that was transmitted to the numerical controller 300 is the last transmission data. If the transmitted NC data is the last transmission data (YES), the processing ends. If the transmitted NC data is not the last transmission data (NO), the process returns to step SC02 and the processing continues.

(Flow of Processing to be Executed by Numerical Controller 300)

[Step SD01] An operation mode is switched to the DNC operation mode. For example, it is monitored whether an operator issued a switching command for switching to the DNC operation mode from an operation screen or the like, and an operation mode is switched to the DNC operation mode if a switching command is confirmed.

[Step SD02] The DNC operation is started.

[Step SD03] It is determined whether or not the NC data was received from the host apparatus 100. If the NC data was received (YES), the process proceeds to step SD04. If the NC data was not received (NO), the process waits for the reception of the NC data.

[Step SD04] One block of the received NC data is analyzed.

[Step SD05] It is determined whether or not the received NC data is the last data of the DNC operation. If the received NC data is the last data (YES), the processing ends. If the received NC data is not the last data (NO), the process proceeds to step SD06.

[Step SD06] It is determined whether or not the received NC data is one among a sub program call, a repeat instruction, and a branch instruction. If the received NC data is one among the sub program call, the repeat instruction, and the branch instruction (YES), the process proceeds to step SD07. If the received NC data is not one among the sub program call, the repeat instruction, and the branch instruction (NO), the process proceeds to step SD11.

[Step SD07] The sub program call information is stored only when the received NC data is a sub program call.

[Step SD08] The search information is extracted.

[Step SD09] The extracted search information is transmitted.

[Step SD10] The remaining received NC data is discarded, and the process returns to step SD03 and the processing continues.

[Step SD11] One block of the received NC data is executed.

[Step SD12] It is determined whether or not the executed block is the last block of the received NC data. If the executed block is the last block (YES), the process returns to step SD03 and the processing continues. If the executed block is not the last block (NO), the process returns to step SD04 and the processing continues.

Figure 9:
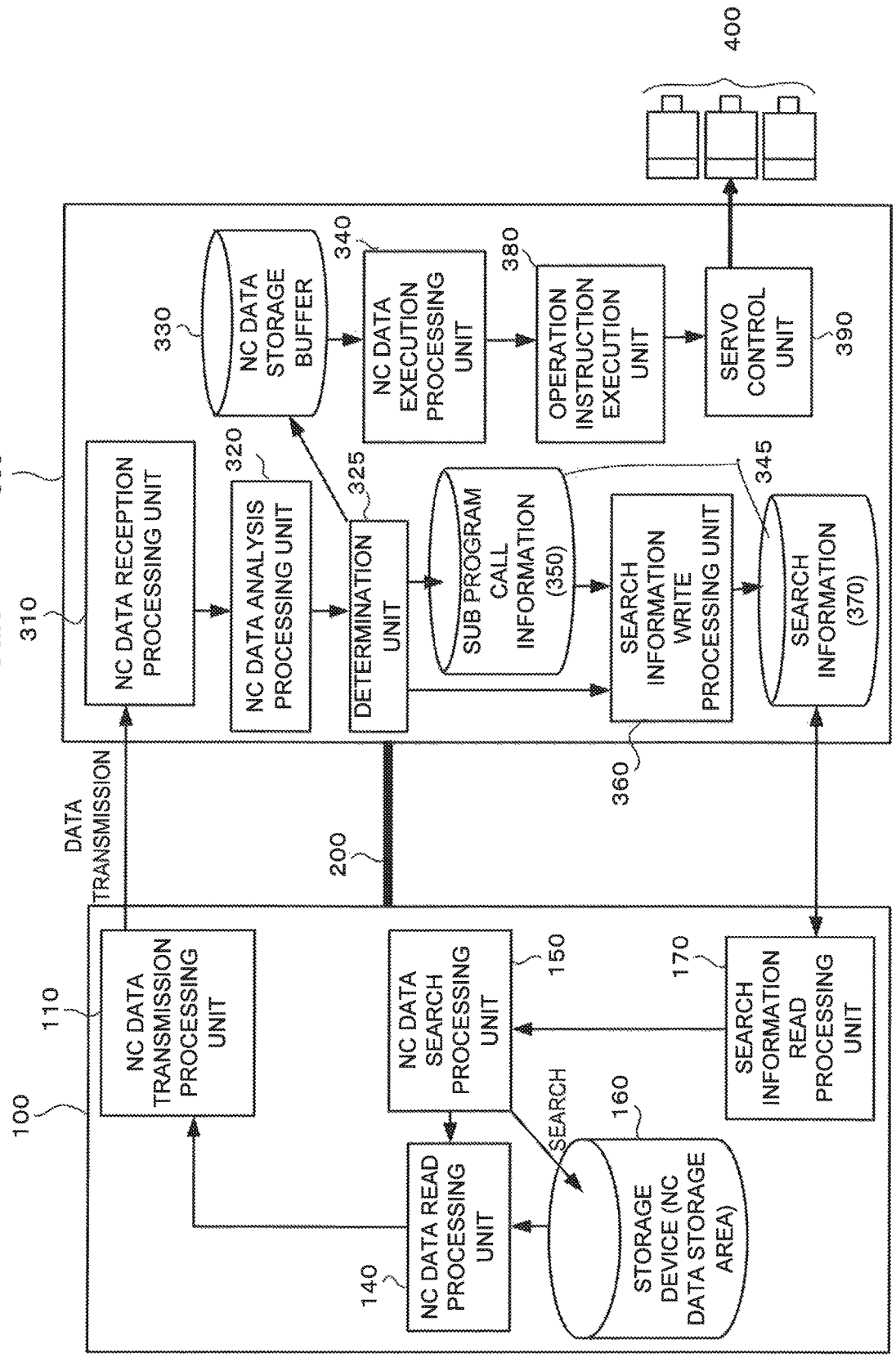
FIG. 9 is a block diagram showing a first improvement of the first embodiment of the DNC operation system depicted in FIG. 1.

FIG. 9 is a block diagram showing a first improvement of the first embodiment of the DNC operation system, and an NC data storage buffer 330 is added to the numerical controller 300 depicted in FIG. 1.

When the numerical controller 300 simultaneously performs the processing of analysis and operation to the NC data of the same block that was received, a delay will arise from the writing into the search information 370 in the storage device 345 to the transmission of the searched NC data by the host apparatus 100, and there are cases where the operation is temporarily discontinued. Thus, with the DNC operation system shown in FIG. 9, by performing the analysis processing of the NC data (that is, performing the prefetch analysis) antecedent to the operation processing and buffering the analyzed data in the NC data storage buffer 330, the discontinuation of the operation can be avoided.

Figure 10:
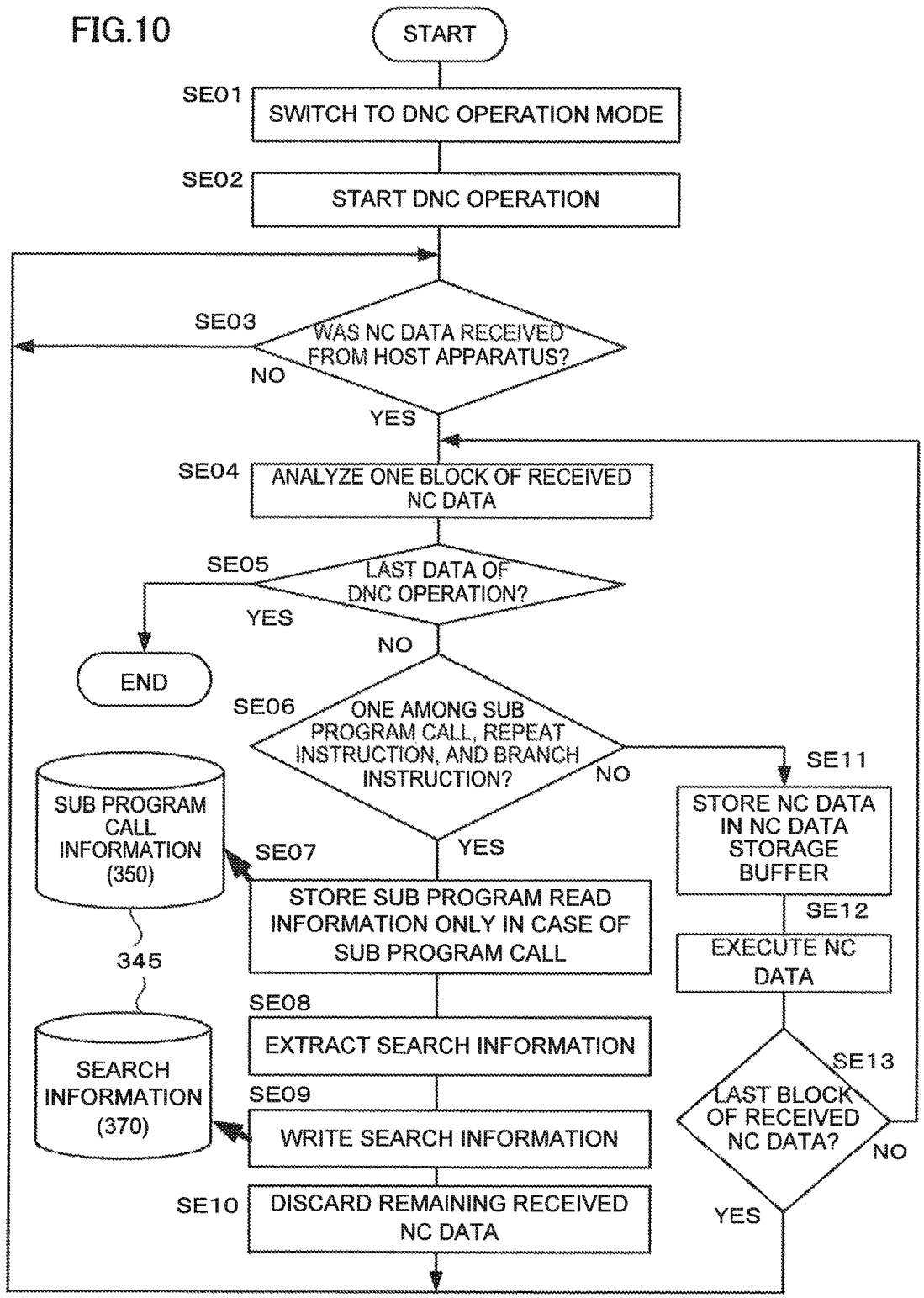
FIG. 10 is a flowchart explaining the flow of processing to be executed by the numerical controller configuring the DNC operation system depicted in FIG. 9.

The processing to be executed by the numerical controller 300 configuring the DNC operation system depicted in FIG. 9 is now explained with reference to the flowchart shown in FIG. 10. Note that, since the processing to be performed by the host apparatus 100 configuring the DNC operation system depicted in FIG. 9 is the same as the processing shown in the flowchart of FIG. 3, the explanation thereof is omitted. The flowchart shown in FIG. 10 is now explained according to the respective steps.

[Step SE01] An operation mode is switched to the DNC operation mode. For example, it is monitored whether an operator issued a switching command for switching to the DNC operation mode from an operation screen or the like, and an operation mode is switched to the DNC operation mode if a switching command is confirmed.

[Step SE02] The DNC operation is started.

[Step SE03] It is determined whether or not the NC data was received from the host apparatus 100. If the NC data was received (YES), the process proceeds to step SE04. If the NC data was not received (NO), the process waits for the reception of the NC data.

[Step SE04] One block of the received NC data is analyzed.

[Step SE05] It is determined whether or not the analyzed block is the last data of the DNC operation. If the analyzed block is the last data (YES), the processing ends. If the analyzed block is not the last data (NO), the process proceeds to step SE06.

[Step SE06] It is determined whether the received NC data is one among a sub program call, a repeat instruction, and a branch instruction. If the received NC data is one among the sub program call, the repeat instruction, and the branch instruction (YES), the process proceeds to step SE07. If the received NC data is not one among the sub program call, the repeat instruction, and the branch instruction (NO), the process proceeds to step SE11.

[Step SE07] The sub program call information is stored only when the received NC data is a sub program call.

[Step SE08] The search information is extracted.

[Step SE09] The extracted search information is written into the search information 370 in the storage device 345.

[Step SE10] The remaining received NC data is discarded, and the process returns to step SE03 and the processing continues.

[Step SE11] The analyzed NC data is stored in the NC data storage buffer 330.

[Step SE12] The NC data is executed.

[Step SE13] It is determined whether or not the executed block is the last block of the received NC data. If the executed block is the last block (YES), the process returns to step SE03 and the processing continues. If the executed block is not the last block (NO), the process returns to step SE04 and the processing continues.

Figure 11:
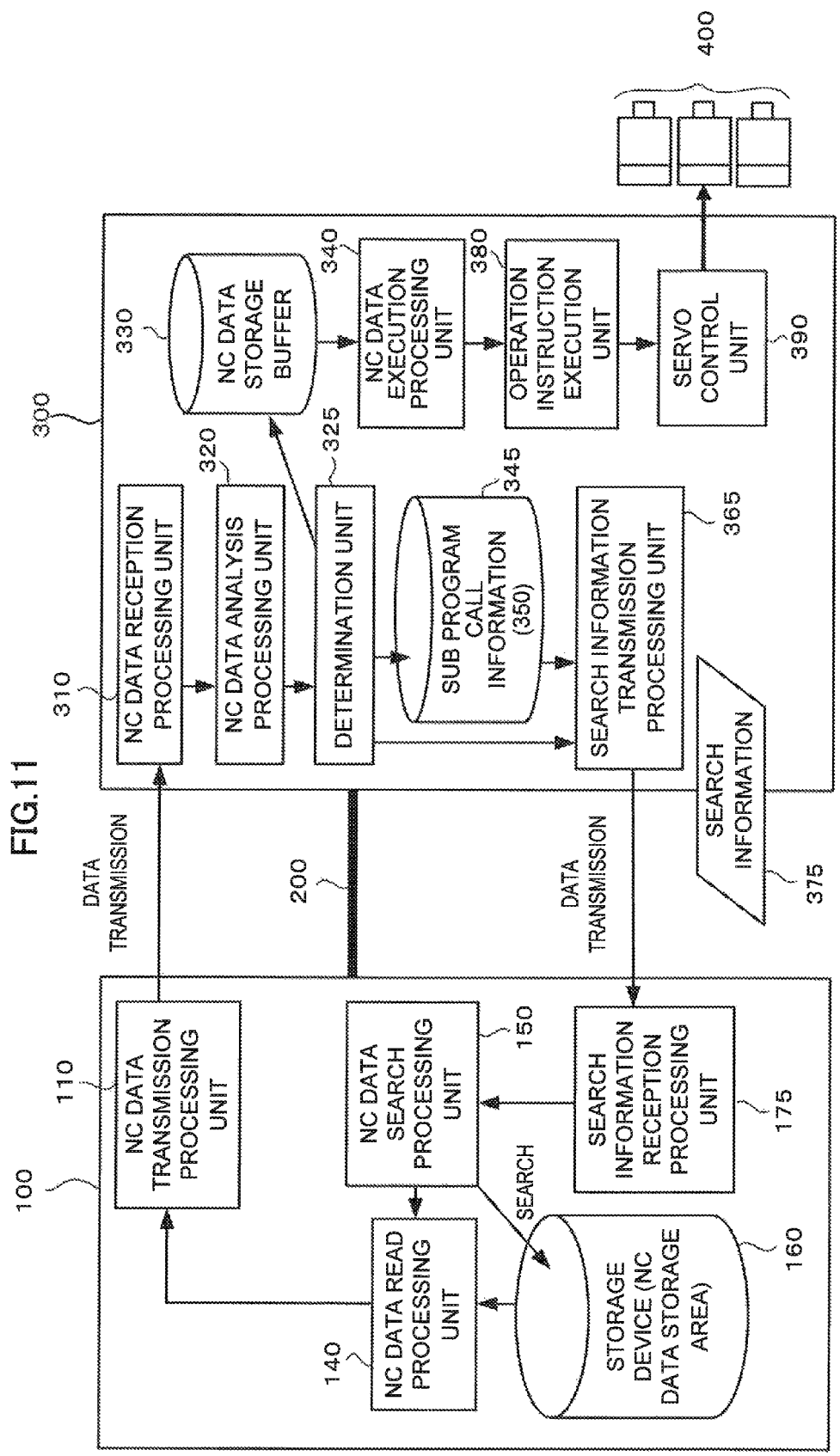
FIG. 11 is a block diagram showing a first improvement of the second embodiment of the DNC operation system depicted in FIG. 5.

FIG. 11 is a block diagram showing a first improvement of the second embodiment of the DNC operation system depicted in FIG. 5, and an NC data storage buffer 330 is added to the numerical controller 300 depicted in FIG. 5.

When the numerical controller 300 simultaneously performs the processing of analysis and operation with respect to the NC data of the same block that was received, a delay will arise from the transmission of the search information 375 to the host apparatus 100 to the transmission of the searched NC data by the host apparatus 100, and there are cases where the operation is temporarily discontinued. Thus, with the DNC operation system shown in FIG. 11, by performing the analysis processing of the NC data (that is, performing the prefetch analysis) antecedent to the operation processing and buffering the analyzed data in the NC data storage buffer 330, the discontinuation of the operation can be avoided.

Figure 12:
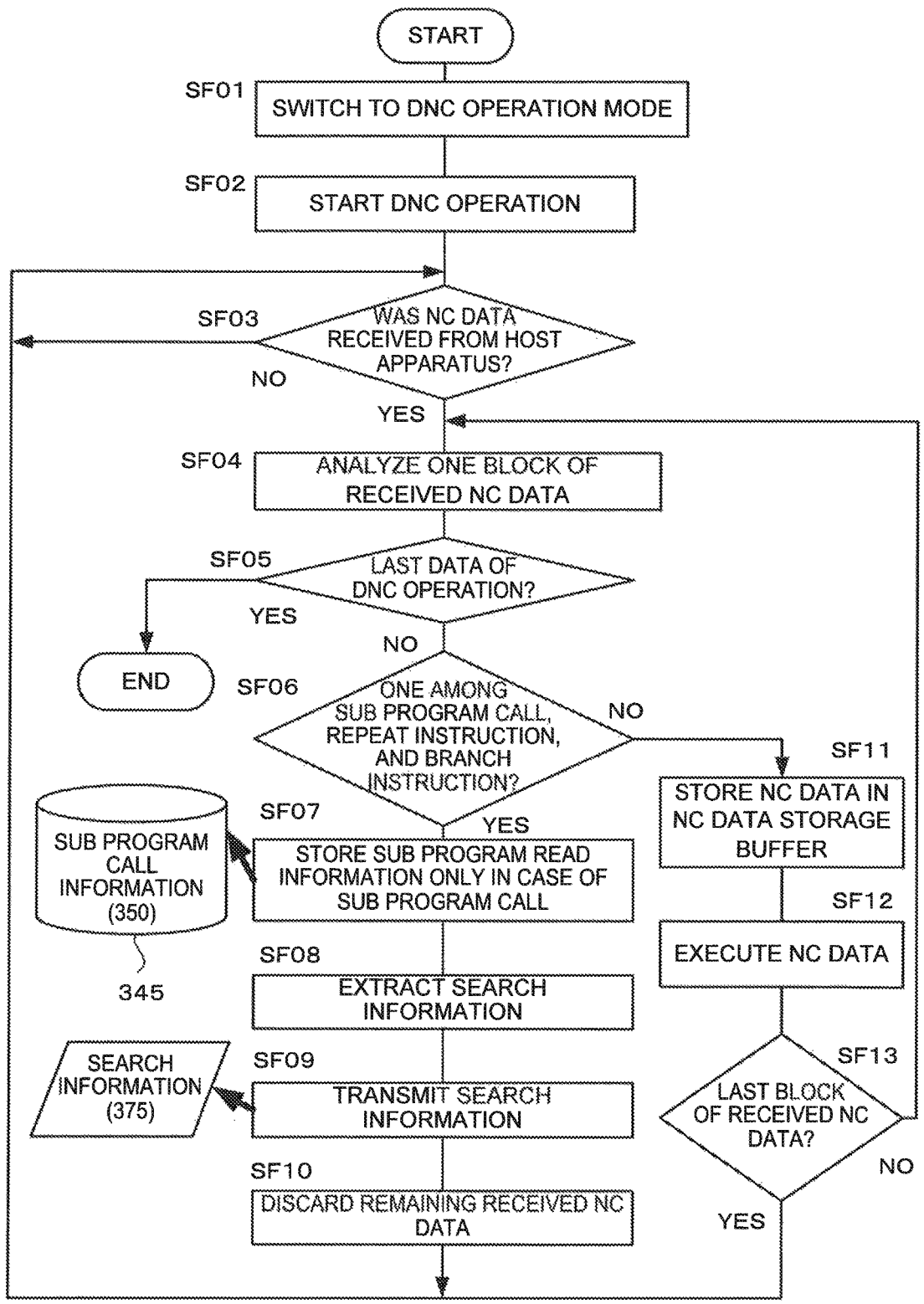
FIG. 12 is a flowchart explaining the flow of processing to be executed by the numerical controller configuring the DNC operation system depicted in FIG. 11.

The processing to be executed by the numerical controller 300 configuring the DNC operation system depicted in FIG. 11 is now explained with reference to the flowchart shown in FIG. 12. Note that, since the processing to be performed by the host apparatus 100 configuring the DNC operation system depicted in FIG. 11 is the same as the processing shown in the flowchart of FIG. 7, the explanation thereof is omitted. The flowchart shown in FIG. 12 is now explained according to the respective steps.

[Step SF01] An operation mode is switched to the DNC operation mode. For example, it is monitored whether an operator issued a switching command for switching to the DNC operation mode from an operation screen or the like, and an operation mode is switched to the DNC operation mode if a switching command is confirmed.

[Step SF02] The DNC operation is started.

[Step SF03] It is determined whether the NC data was received from the host apparatus 100. If the NC data was received (YES), the process proceeds to step SF04. If the NC data was not received (NO), the process waits for the reception of the NC data.

[Step SF04] One block of the received NC data is analyzed.

[Step SF05] It is determined whether or not the analyzed block is the last data of the DNC operation. If the analyzed block is the last data (YES), the processing ends. If the analyzed block is not the last data (NO), the process proceeds to step SF06.

[Step SF06] It is determined whether the received NC data is one among a sub program call, a repeat instruction, and a branch instruction. If the received NC data is one among the sub program call, the repeat instruction, and the branch instruction (YES), the process proceeds to step SF07. If the received NC data is not one among the sub program call, the repeat instruction, and the branch instruction (NO), the process proceeds to step SF11.

[Step SF07] The sub program call information is stored only when the received NC data is a sub program call.

[Step SF08] The search information is extracted.

[Step SF09] The extracted search information is transmitted.

[Step SF10] The remaining received NC data is discarded, and the process returns to step SF03 and the processing continues.

[Step SF11] The analyzed NC data is stored in the NC data storage buffer 330.

[Step SF12] The NC data is executed.

[Step SF13] It is determined whether or not the executed block is the last block of the received NC data. If the executed block is the last block (YES), the process returns to step SF03 and the processing continues. If the executed block is not the last block (NO), the process returns to step SF04 and the processing continues.

Figure 13:
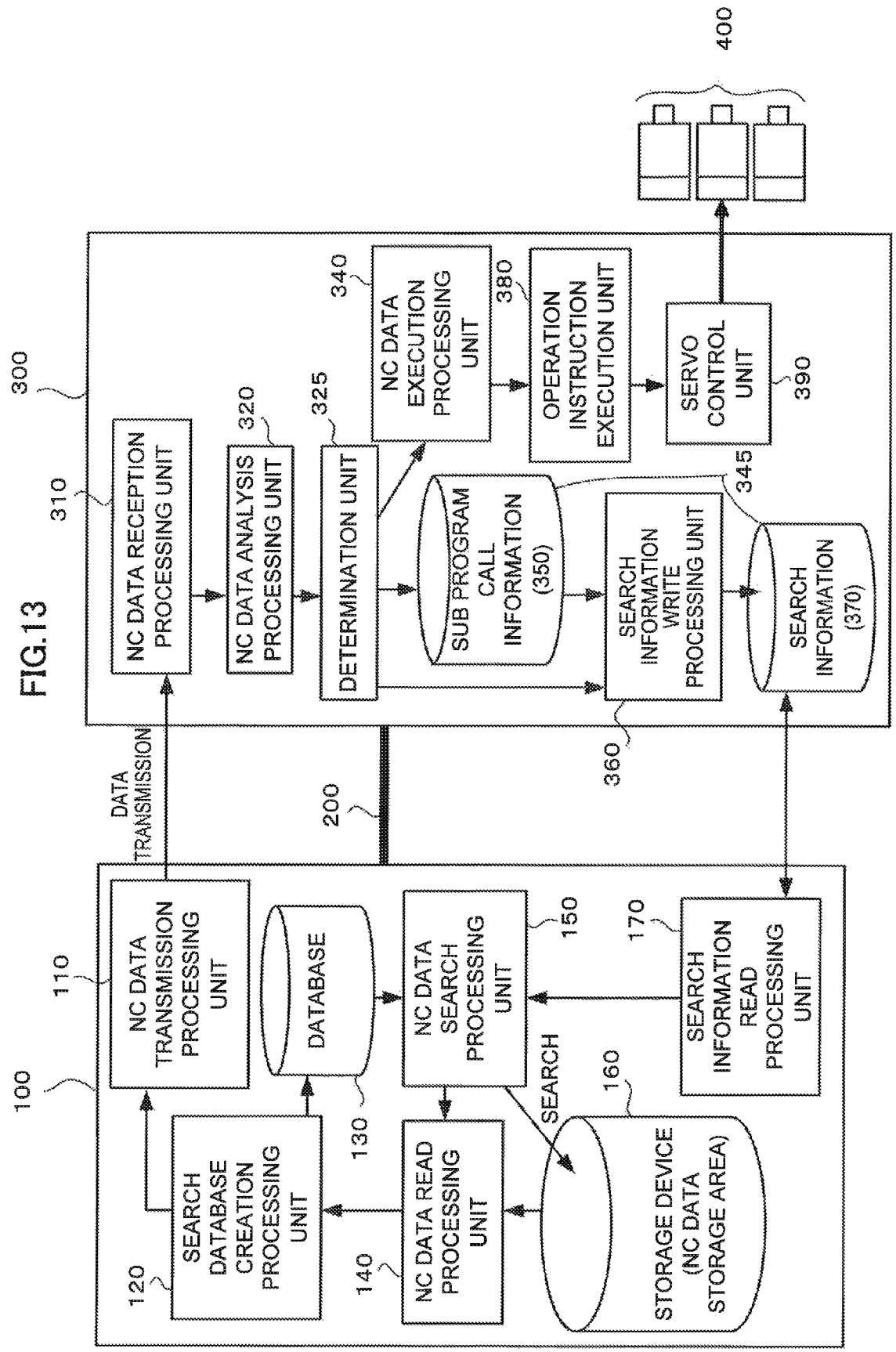
FIG. 13 is a block diagram showing a second improvement of the first embodiment of the DNC operation system depicted in FIG. 1.

FIG. 13 is a block diagram showing a second improvement of the first embodiment of the DNC operation system.

With the DNC operation system depicted in FIG. 13, the search database creation processing unit 120 in the host apparatus 100 analyzes the NC data before the NC data is transmitted to the numerical controller 300, and stores, in a database 130, a sequence number that is required for searching the NC data and a folder name containing a block pointer or a sub program in the NC data corresponding to the sequence number. By using this database 130, the NC data search processing unit 150 can speed up the processing of the NC data search processing unit 150 in response to the contents of the search information 370.

Figure 15:
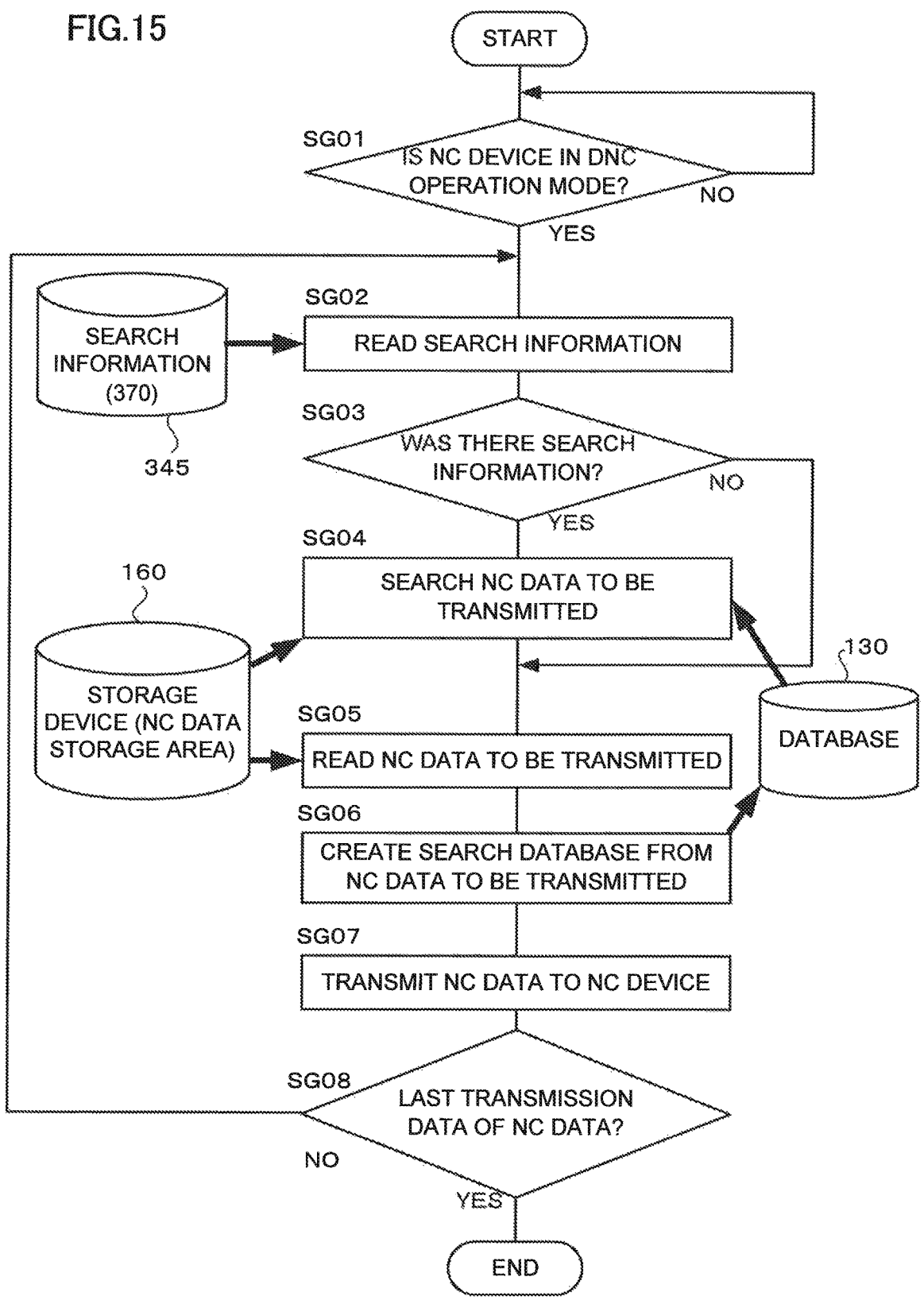
FIG. 15 is a flowchart explaining the flow of processing to be executed by the host apparatus (host computer) configuring the DNC operation system depicted in FIG. 13.

The processing to be executed by the host apparatus 100 configuring the DNC operation system depicted in FIG. 13 is now explained with reference to the flowchart shown in FIG. 15. Note that, since the processing to be performed by the numerical controller 300 configuring the DNC operation system depicted in FIG. 13 is the same as the processing shown in the flowchart of FIG. 4, the explanation thereof is omitted. The flowchart shown in FIG. 15 is now explained according to the respective steps.

[Step SG01] It is determined whether the numerical controller 300 is in the DNC operation mode or not. If the numerical controller 300 is in the DNC operation mode (YES), the process proceeds to step SG02. If the numerical controller 300 is not in the DNC operation mode (NO), the process waits until the numerical controller 300 switches to the DNC operation mode.

[Step SG02] Read processing of reading the search information 370 from the storage device 345 in the numerical controller 300 is performed.

[Step SG03] It is determined whether or not there was any search information 370 that was read in the processing of step SG02. If the search information 370 was read (YES), the process proceeds to step SG04. If the search information 370 was not read (NO), the process proceeds to step SG05.

[Step SG04] The NC data corresponding to the search information 370 is searched from the storage device 160 in the host apparatus 100.

[Step SG05] The NC data corresponding to the search information 370 (when the search information 370 was read) or subsequent data of the NC data that was transmitted the last time (when the search information 370 was not read) is read from the storage device 160.

[Step SG06] Search database is created from the NC data to be transmitted.

[Step SG07] The NC data that was read in step SG05 is transmitted to the numerical controller 300.

[Step SG08] It is determined whether the NC data that was transmitted to the numerical controller 300 is the last transmission data or not. If the transmitted NC data is the last transmission data (YES), the processing ends. If the transmitted NC data is not the last transmission data (NO), the process returns to step SG02 and the processing continues.

Figure 14:
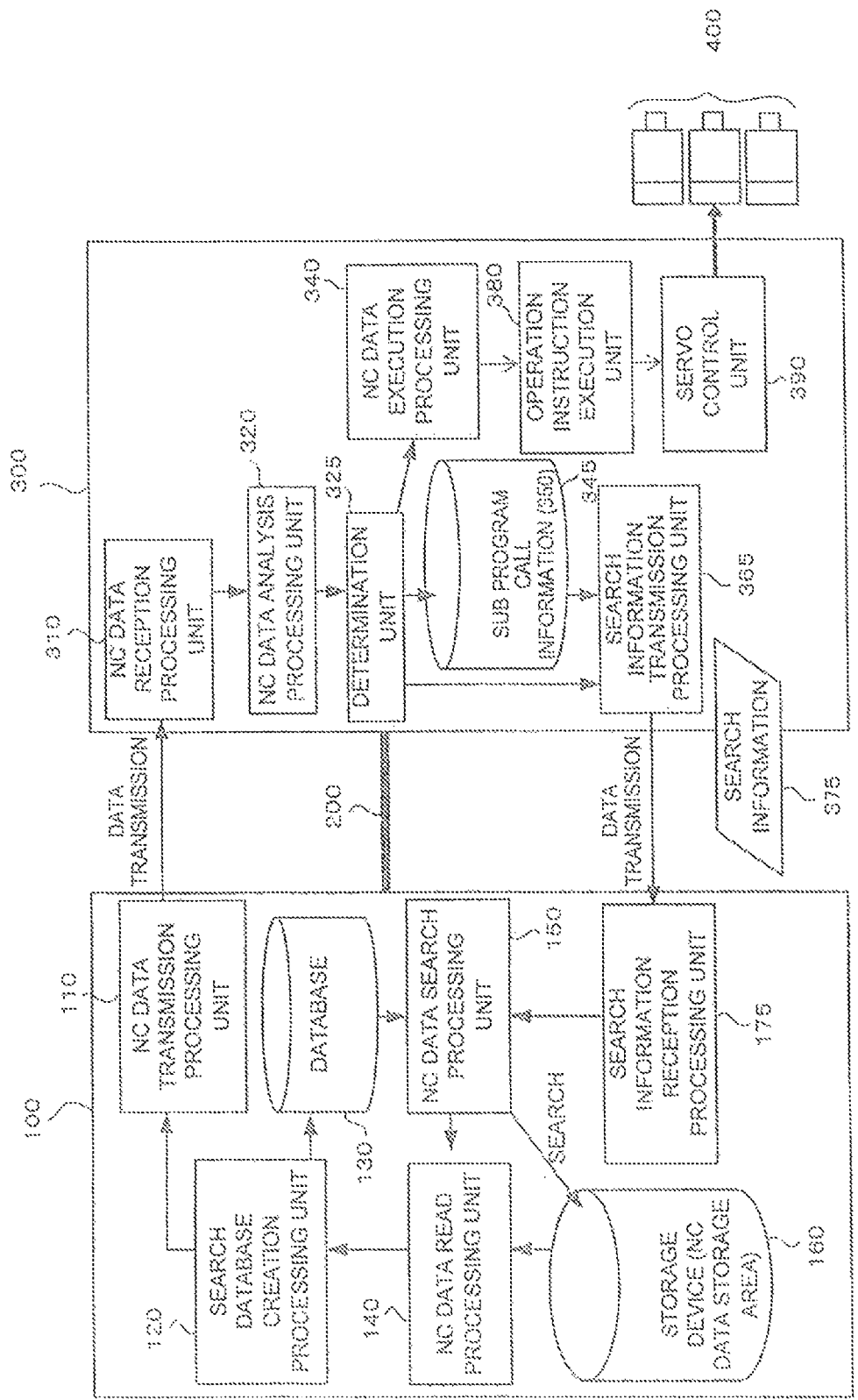
FIG. 14 is a block diagram showing a second improvement of the second embodiment of the DNC operation system depicted in FIG. 5.

FIG. 14 is a block diagram showing a second improvement of the second embodiment of the DNC operation system according to the present invention.

With the DNC operation system depicted in FIG. 14, the search database creation processing unit 120 in the host apparatus 100 analyzes the NC data before the NC data is transmitted to the numerical controller 300, and stores, in a database 130, a sequence number that is required for searching the NC data and a folder name containing a block pointer or a sub program in the NC data corresponding to the sequence number. By using this database 130, the NC data search processing unit 150 can speed up the processing of the NC data search processing unit 150 in response to the contents of the search information 375.

Figure 16:
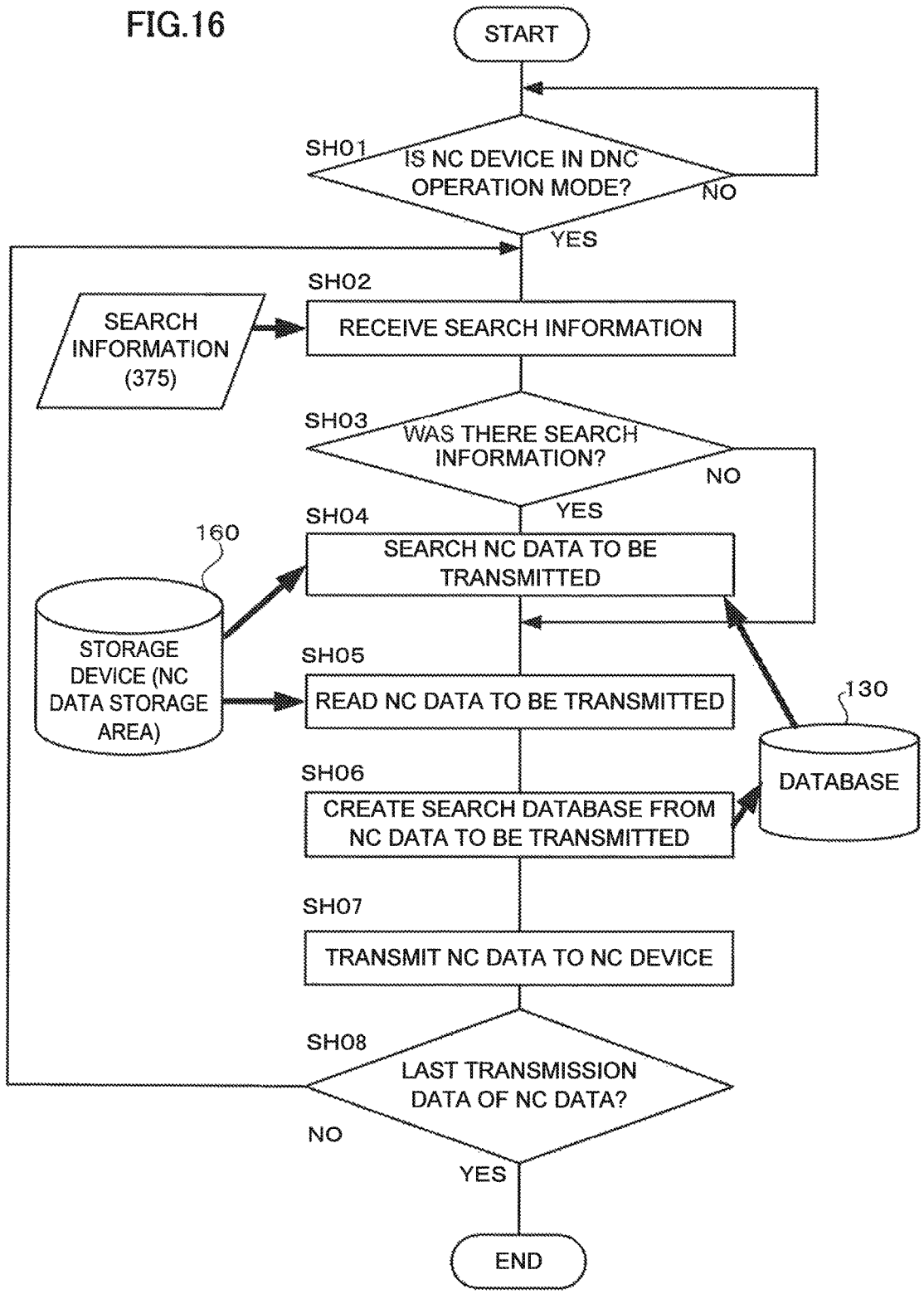
FIG. 16 is a flowchart explaining the flow of processing to be executed by the host apparatus (host computer) configuring the DNC operation system depicted in FIG. 14.
Figure 17:
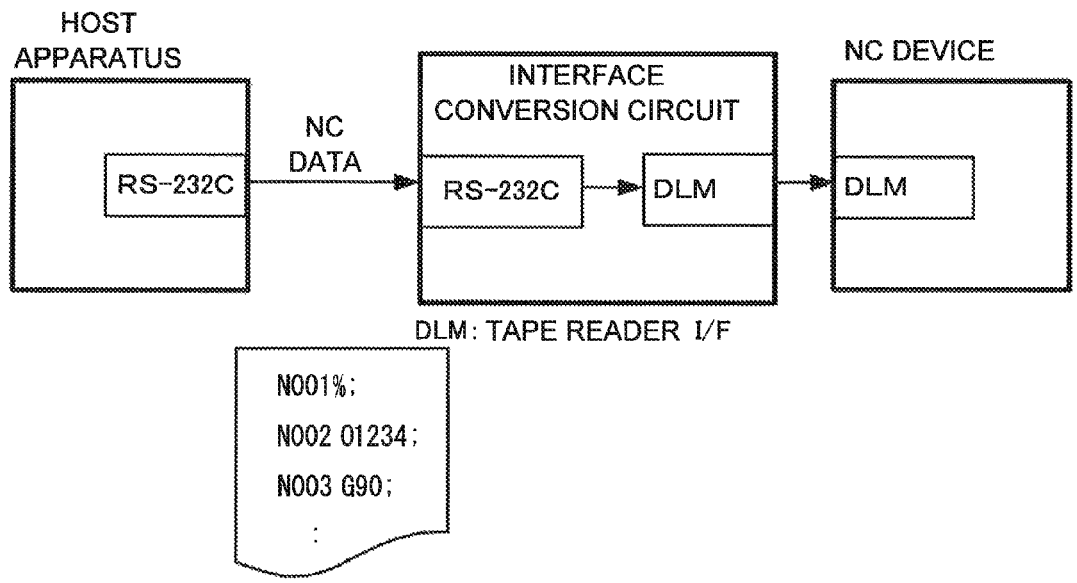
FIG. 17 is a diagram explaining the first example of a conventional DNC operation system.
Figure 18:
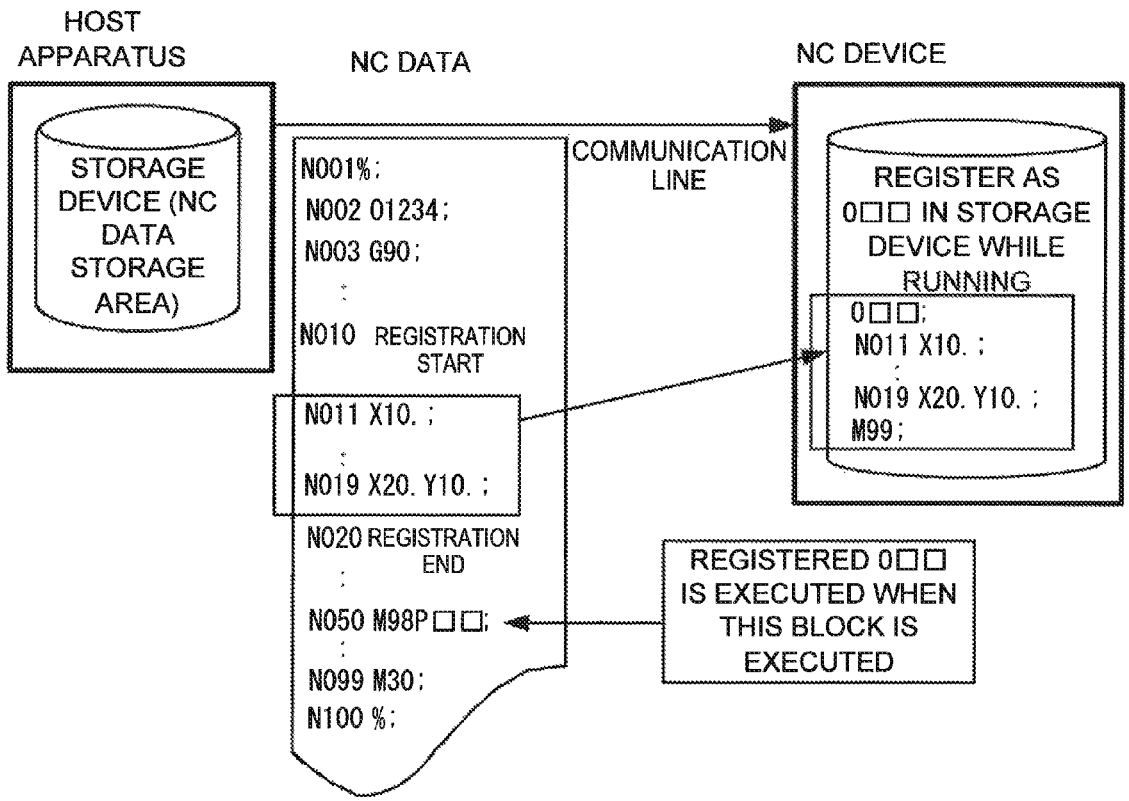
FIG. 18 is a diagram explaining the second example of a conventional DNC operation system.

The processing to be executed by the host apparatus 100 configuring the DNC operation system depicted in FIG. 14 is now explained with reference to the flowchart shown in FIG. 16. Note that, since the processing to be performed by the numerical controller 300 configuring the DNC operation system depicted in FIG. 14 is the same as the processing shown in the flowchart of FIG. 8, the explanation thereof is omitted. The flowchart shown in FIG. 16 is now explained according to the respective steps.

[Step SH01] It is determined whether the numerical controller 300 is in the DNC operation mode or not. If the numerical controller 300 is in the DNC operation mode (YES), the process proceeds to step SH02. If the numerical controller 300 is not in the DNC operation mode (NO), the process waits until the numerical controller 300 switches to the DNC operation mode.

[Step SH02] The search information 375 is received from the numerical controller 300.

[Step SH03] It is determined whether or not there was any search information 375 that was received in the processing of step SH02. If the search information 375 was received (YES), the process proceeds to step SH04. If the search information 375 was not received (NO), the process proceeds to step SH05.

[Step SH04] The NC data corresponding to the search information 375 is searched from the storage device 160 in the host apparatus 100.

[Step SH05] The NC data corresponding to the search information 375 (when the search information 375 was received) or subsequent data of the NC data that was transmitted the last time (when the search information 375 was not received) is read from the storage device 160.

[Step SH06] Search database are created from the transmitted NC data.

[Step SH07] The NC data that was read in step SH05 is transmitted to the numerical controller 300.

[Step SH08] It is determined whether or not the NC data that was transmitted to the numerical controller 300 is the last transmission data. If the transmitted NC data is the last transmission data (YES), the processing ends. If the transmitted NC data is not the last transmission data (NO), the process returns to step SH02 and the processing continues.

What is claimed is:
1. A direct numerical control (DNC) operation system, comprising:
  a host apparatus comprising a storage device;
  a numerical controller comprising a storage device; and
  a communication line connecting the numerical controller to the host apparatus, the communication line being configured to perform bidirectional communication and to successively transmit numerical control (NC) data stored in the storage device of the host apparatus to the numerical controller to perform a DNC operation,
  wherein
  the numerical controller is configured to perform operation using the NC data received from the host apparatus via the communication line, and the numerical controller comprises a processor configured as:
    a determination unit configured to determine whether the NC data received from the host apparatus includes any of a sub program, a repeat instruction and a branch instruction; and
    a search information write processing unit configured to write, in the storage device in the numerical controller, search information for searching the NC data stored in the storage device in the host apparatus and to discard the received NC data, in response to a determination by the determination unit that the received NC data includes any of the sub program, the repeat instruction and the branch instruction, the host apparatus comprises a processor configured as:
a search information read processing unit configured to read the written search information;
an NC data search processing unit configured to search the NC data stored in the storage device in the host apparatus on the basis of the read search information; and
an NC data transmission processing unit configured to transmit the searched NC data to the numerical controller, the numerical controller is further configured to
determine whether the NC data received after the search information is written is the searched NC data that has been searched by the host apparatus, and
in response to a determination that the NC data received after the search information is written is the searched NC data, perform the operation on the basis of the NC data received after the search information is written, the numerical controller is further configured to perform a prefetch antecedent to the operation of the NC data received from the host apparatus via the communication line, analyze the received NC data, and then store the analyzed NC data in the storage device of the numerical controller; and in response to a determination that the analyzed NC data includes any of the sub program call, the repeat instruction and the branch instruction, the search information write processing unit is configured to write, in the storage device in the numerical controller, search information that is required for searching for the NC data which is required by the host apparatus to execute the relevant instruction.

2. The DNC operation system according to claim 1, wherein the search information is:
a program name of a call destination for a sub program call;
a program name of a call source and NC data information of a restoration destination for restoration from a sub program call; and
a program name and sequence number information of a repeat destination or a branch destination for a repeat instruction and a branch instruction.

3. The DNC operation system according to claim 1, wherein
the host apparatus is configured to analyze the NC data to be transmitted antecedent to transmitting the NC data to the numerical controller, and compile a database storing a sequence number required for searching the NC data and a folder name containing a block pointer or a sub program in the NC data corresponding to the sequence number; and
the NC data search processing unit is configured to, on the basis of the search information received from the numerical controller, search the NC data from information of the compiled database.

4. A direct numerical control (DNC) operation system, comprising:

a host apparatus comprising a storage device;
a numerical controller; and
a communication line connecting the numerical controller to the host apparatus, the communication line being configured to perform bidirectional communication and to successively transmit numerical control (NC) data stored in the storage device of the host apparatus to the numerical controller to perform a DNC operation, wherein
the numerical controller is configured to perform operation using the NC data received from the host apparatus via the communication line, the numerical controller comprising a processor configured as:
a determination unit configured to determine whether the NC data received from the host apparatus includes any of a sub program, a repeat instruction and a branch instruction; and
a search information transmission processing unit configure to transmit, to the host apparatus, search information for searching the NC data stored in the storage device of the host apparatus and to discard the received NC data, in response to a determination by the determination unit that the received NC data includes any of the sub program, the repeat instruction and the branch instruction, the host apparatus comprises a processor configured as:
an NC data search processing unit configured to search the NC data stored in the storage device in the host apparatus on the basis of the search information received from the numerical controller; and
an NC data transmission processing unit configured to transmit the searched NC data to the numerical controller, the numerical controller is further configured to
determine whether the NC data received after the search information is transmitted is the searched NC data that has been searched by the host apparatus, and
in response to a determination that the NC data received after the search information is transmitted is the searched NC data, perform the operation on the basis of the NC data received after the search information is transmitted, the numerical controller is further configured to perform a prefetch antecedent to the operation of the NC data received from the host apparatus via the communication line, analyze the received NC data, and then store the analyzed NC data in the storage device of the numerical controller; and in response to a determination that the analyzed NC data includes any of the sub program call, the repeat instruction and the branch instruction, the search information transmission processing unit is configured to transmit, to the host apparatus, search information that is required for searching for the NC data which is required by the host apparatus to execute the relevant instruction.

* * * * *